US012542234B2

(12) United States Patent
Yoshioka et al.

(10) Patent No.: US 12,542,234 B2
(45) Date of Patent: Feb. 3, 2026

(54) INDUCTOR COMPONENT AND METHOD OF MANUFACTURING INDUCTOR COMPONENT

(71) Applicant: Murata Manufacturing Co., Ltd., Kyoto-fu (JP)

(72) Inventors: Yoshimasa Yoshioka, Nagaokakyo (JP); Ryuichiro Tominaga, Nagaokakyo (JP); Yayoi Hisada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 621 days.

(21) Appl. No.: 18/065,198

(22) Filed: Dec. 13, 2022

(65) Prior Publication Data

US 2023/0187122 A1 Jun. 15, 2023

(30) Foreign Application Priority Data

Dec. 14, 2021 (JP) ................................ 2021-202782

(51) Int. Cl.

| | |
|---|---|
| ***H01F 5/00*** | (2006.01) |
| ***H01F 27/255*** | (2006.01) |
| ***H01F 27/28*** | (2006.01) |
| ***H01F 27/32*** | (2006.01) |
| ***H01F 41/02*** | (2006.01) |
| ***H01F 41/12*** | (2006.01) |

(52) U.S. Cl.

CPC ......... *H01F 27/323* (2013.01); *H01F 27/255* (2013.01); *H01F 27/2804* (2013.01); *H01F 41/0206* (2013.01); *H01F 41/12* (2013.01); *H01F 2027/2809* (2013.01)

(58) Field of Classification Search

CPC ........................................ H01F 27/323
USPC ........................................ 336/200, 221
See application file for complete search history.

(56) References Cited

U.S. PATENT DOCUMENTS

| | | | | |
|---|---|---|---|---|
| 2014/0360756 | A1* | 12/2014 | Honda | H01B 3/306 174/119 C |
| 2017/0294249 | A1* | 10/2017 | Oya | H02K 3/30 |
| 2019/0206611 | A1* | 7/2019 | Matsumoto | H01F 17/04 |
| 2020/0075219 | A1* | 3/2020 | Matsumoto | H01F 27/32 |

(Continued)

FOREIGN PATENT DOCUMENTS

| | | |
|---|---|---|
| JP | 2007-242800 A | 9/2007 |
| JP | 2017-011185 A | 1/2017 |
| JP | 2021-068805 A | 4/2021 |

*Primary Examiner* — Ronald Hinson

(74) *Attorney, Agent, or Firm* — Studebaker Brackett PLLC

(57) ABSTRACT

An inductor component includes an element body, a coil in the element body, and a non-magnetic insulation layer covering at least part of the coil. The element body includes first and second magnetic layers laminated in order in a first direction. The coil includes a small-turn inductor wiring of 0.5 or less turns extending along a plane orthogonal to the first direction between the first and second magnetic layers. In a first cross-section orthogonal to an extending direction of the small-turn inductor wiring, the small-turn inductor wiring has a top surface facing in the first direction, a bottom surface facing in a second direction opposite from the first direction, a first side surface facing in a third direction orthogonal to the first direction, and a second side surface facing in a fourth direction opposite from the third direction.

18 Claims, 16 Drawing Sheets

(56) References Cited

U.S. PATENT DOCUMENTS

| | | | | |
|---|---|---|---|---|
| 2020/0128675 | A1* | 4/2020 | Matsumoto | H05K 3/4658 |
| 2021/0065950 | A1* | 3/2021 | Miyake | H01F 19/04 |
| 2021/0090781 | A1* | 3/2021 | Tominaga | H01F 27/2804 |
| 2022/0310293 | A1* | 9/2022 | Kawakami | H01F 17/0006 |

* cited by examiner

INDUCTOR COMPONENT AND METHOD OF MANUFACTURING INDUCTOR COMPONENT

CROSS-REFERENCE TO RELATED APPLICATION

This application claims benefit of priority to Japanese Patent Application No. 2021-202782, filed Dec. 14, 2021, the entire content of which is incorporated herein by reference.

BACKGROUND

Technical Field

The present disclosure relates to an inductor component and a method of manufacturing the inductor component.

Background Art

Japanese Unexamined Patent Application Publication No. 2017-11185 describes an inductor component of a related art. The inductor component includes an element body having a magnetic layer, a coil disposed in the element body, and a non-magnetic insulation layer covering the coil. The coil has layers of spiral wirings. Each spiral wiring has one or more turns. The insulation layer has a hole in a region corresponding to an inner magnetic path of the coil, and part of the element body is provided in the hole.

SUMMARY

It has been found that the following problems arise when a spiral wiring of 0.5 or less turns is used in an inductor component according to the related art. The spiral wiring of 0.5 or less turns has a curved portion that is shorter than that of a spiral wiring of one or more turns, and has a shape that is not completely wound. This makes the orientation of a contact surface between the insulation layer covering the spiral wiring and the element body uneven as compared with the spiral wiring of one or more turns, and there is a possibility that a degree of adhesion between the insulation layer and the element body in a specific direction decreases. Accordingly, when the element body and the insulation layer expand or contract because of, for example, a thermal load or the like, there is a possibility that a gap is generated between the insulation layer and the element body due to a difference in expansion coefficient and the low degree of adhesion in the specific direction, moisture enters the gap, and the deterioration of the inductor component is accelerated.

Therefore, the present disclosure provides an inductor component and a method of manufacturing the inductor component capable of increasing a degree of adhesion between an element body and an insulation layer and increasing reliability.

An inductor component as an aspect of the present disclosure includes an element body, a coil disposed in the element body, and an insulation layer that is a non-magnetic layer covering at least part of the coil. The element body includes a first magnetic layer and a second magnetic layer laminated in order in a first direction. The coil includes a small-turn inductor wiring of 0.5 or less turns extending along a plane orthogonal to the first direction between the first magnetic layer and the second magnetic layer. In a first cross-section orthogonal to an extending direction of the small-turn inductor wiring, the small-turn inductor wiring has a top surface facing in the first direction, a bottom surface facing in a second direction opposite from the first direction, a first side surface facing in a third direction orthogonal to the first direction, and a second side surface facing in a fourth direction opposite from the third direction. Also, the insulation layer has at least one portion of a top surface portion positioned further in the first direction relative to the top surface and a bottom surface portion positioned further in the second direction relative to the bottom surface, a first side surface portion covering the first side surface, a second side surface portion covering the second side surface, a first protrusion protruding from the at least one portion further in the third direction relative to the first side surface portion, and a second protrusion protruding from the at least one portion further in the fourth direction relative to the second side surface portion.

Here, with respect to the number of turns of the small-turn inductor wiring, 0.5 or less turns refer to a state in which, when viewed in an axial direction of the coil, a center angle of lines connecting each center of both end portions of the small-turn inductor wiring and an axis of the coil is 180° or less, or a state, such as a linear shape or a meander shape, in which the coil is not wound into circles.

According to the aspect, since the first protrusion and the second protrusion are provided, the contact area between the insulation layer and the element body may be increased by the first protrusion and the second protrusion, and the first protrusion and the second protrusion may be made to enter the element body. Thus, the degree of adhesion between the insulation layer and the element body is increased, and the reliability of the inductor component may be increased.

Preferably, in an embodiment of the inductor component, multiple layers of the small-turn inductor wiring are present in the first direction, and in the first cross-section, a protrusion with a different length is included in all of first protrusions and second protrusions.

According to the embodiment, by increasing the length of some of the first or second protrusion, the degree of adhesion between the insulation layer and the element body may further be increased. Further, by decreasing the length of some of the first or second protrusion, magnetic resistance of the magnetic path may be reduced and the inductance acquisition efficiency may be increased.

Preferably, in an embodiment of the inductor component, multiple layers of the small-turn inductor wiring are present in the first direction, and in the first cross-section, the small-turn inductor wiring positioned further in the first direction has shorter lengths of the first protrusion and the second protrusion.

According to the embodiment, since the lengths of the first and second protrusions are shorter in the inductor wiring positioned further in the first direction, the area of the magnetic path of the coil is larger further in the first direction. Thus, when the coil is filled with the second magnetic layer in the second direction from the first direction side of the coil at the time of manufacturing, the coil is easily filled with the second magnetic layer. This makes it possible to increase a filling rate, and to increase the inductance.

Preferably, in an embodiment of the inductor component, in the first cross-section, at least one of the first protrusion and the second protrusion is slanted in the second direction.

According to the embodiment, since at least one of the first protrusion and the second protrusion is slanted in the second direction, when the coil is filled with the second magnetic layer in the second direction from the first direction side of the coil at the time of manufacturing, the filling the coil with the second magnetic layer becomes smooth. Further, the slant of the protrusion in the second direction may prevent the second magnetic layer from coming off in the first direction after the filling with the second magnetic layer. This makes it possible to further increase the degree of adhesion between the insulation layer and the element body.

Preferably, in an embodiment of the inductor component, in the first cross-section, at least one of the first protrusion and the second protrusion is slanted in the first direction.

According to the embodiment, since at least one of the first protrusion and the second protrusion is slanted in the first direction, when the coil is filled with the first magnetic layer in the first direction from the second direction side of the coil at the time of manufacturing, the filling the coil with the first magnetic layer becomes smooth. Further, the slant of the protrusion in the first direction may prevent the first magnetic layer from coming off in the second direction after the filling with the first magnetic layer. This makes it possible to further increase the degree of adhesion between the insulation layer and the element body.

Preferably, in an embodiment of the inductor component, multiple layers of the small-turn inductor wiring are present in the first direction, the coil is configured to have one or more turns by connecting in series the multiple layers of the small-turn inductor wirings, and in the first cross-section, all of first protrusions and second protrusions are positioned in either an inner magnetic path or an outer magnetic path of the coil.

According to the embodiment, the degree of adhesion between the insulation layer and the element body may further be increased.

Preferably, in an embodiment of the inductor component, in the first cross-section, a length of the first protrusion is different from a length of the second protrusion. According to the embodiment, by increasing the length of one of the first and second protrusions, the degree of adhesion between the insulation layer and the element body may further be increased. Further, by decreasing the length of the other of the first and second protrusions, the magnetic resistance of the magnetic path may be reduced and the inductance acquisition efficiency may be increased.

Preferably, in an embodiment of the inductor component, n (n≥2) layers of the small-turn inductor wirings are present in the first direction, and a material of the insulation layer covering a first layer of the small-turn inductor wiring is different from a material of the insulation layer covering an m-th (2≤m≤n) layer of the small-turn inductor wiring.

According to the embodiment, a degree of freedom in design may be increased. For example, the material of the insulation layer covering the first layer of the small-turn inductor wiring is preferably selected in light of stripping from a base substrate and stress. Whereas, the material of the insulation layer covering the m-th layer of the small-turn inductor wiring is preferably selected in view of, for example, laser or photolithography resolution, or step coverage.

Preferably, in an embodiment of the inductor component, the first magnetic layer and the second magnetic layer contain magnetic powder, and a contact surface of the second magnetic layer with the first magnetic layer includes a sectional plane of the magnetic powder, and a contact surface of the first magnetic layer with the second magnetic layer includes a surface of the magnetic powder.

Here, the surface of the magnetic powder refers to a surface of the magnetic powder that is not cut, and is a spherical surface for example, and does not include a sectional plane.

According to the embodiment, since the contact surface of the second magnetic layer may be made flat, when the filling with the first magnetic layer toward the second magnetic layer is performed at the time of manufacturing, pressure may easily be transmitted to the first magnetic layer. Accordingly, the filling rate of the magnetic powder in the first magnetic layer may be increased, and as a result, the inductance is increased.

Preferably, in an embodiment of the inductor component, the insulation layer covers the small-turn inductor wiring, continuously extends in an extending direction of the small-turn inductor wiring, and has a first portion covering the small-turn inductor wiring and a second portion not covering the small-turn inductor wiring. Also, in a second cross-section orthogonal to an extending direction of the second portion, the second portion has a main body portion present at a position corresponding to the extending direction of the small-turn inductor wiring, at least one portion of a top surface portion positioned further in the first direction relative to the main body portion and a bottom surface portion positioned further in the second direction relative to the main body portion, a first protrusion protruding from the at least one portion further in a fifth direction orthogonal to the first direction relative to the main body portion, and a second protrusion protruding from the at least one portion further in a sixth direction opposite from the fifth direction relative to the main body portion.

According to the embodiment, since the second portion is provided in addition to the first portion, the contact area between the insulation layer and the element body may further be increased by the second portion, and the first protrusion and the second protrusion of the second portion may be made to enter the element body. Thus, the degree of adhesion between the insulation layer and the element body is further increased, and the reliability of the inductor component may further be increased.

Further, by providing the dummy insulation layer such as the second portion, when another inductor wiring is relatively laminated to be shifted from part of the small-turn inductor wiring when viewed in the first direction, the other inductor wiring may relatively be overlapped with the second portion in addition to the first portion when viewed in the first direction. This makes it possible to ensure the flatness of the inductor wiring.

Preferably, in an embodiment of the inductor component, another inductor wiring is provided at a position overlapping at least part of the small-turn inductor wiring when viewed in the first direction.

According to the embodiment, since the other inductor wiring does not unnecessarily spread in a planar direction orthogonal to the first direction, the volume of the element body may be increased.

Preferably, in an embodiment of the inductor component, in the first direction, the first magnetic layer or the second magnetic layer present at the same position as the small-turn inductor wiring overlaps part of the other inductor wiring when viewed in a direction orthogonal to the first direction.

According to the embodiment, the volume of the magnetic layer (magnetic path) may be increased.

Preferably, in an embodiment of the inductor component, the first magnetic layer or the second magnetic layer overlapping part of the other inductor wiring is the second magnetic layer positioned in the first direction of the other inductor wiring.

According to the embodiment, the volume of the magnetic layer (magnetic path) may be increased. It is easy to perform filling with the second magnetic layer at the time of manufacturing.

Preferably, in an embodiment of the inductor component, the first magnetic layer or the second magnetic layer overlapping part of the other inductor wiring is the first magnetic layer positioned in the second direction of the other inductor wiring.

According to the embodiment, the volume of the magnetic layer (magnetic path) may be increased. It is easy to perform filling with the first magnetic layer at the time of manufacturing.

Preferably, an embodiment of a method of manufacturing an inductor component includes forming a small-turn inductor wiring of 0.5 or less turns having, in a first cross-section orthogonal to an extending direction, a top surface facing in a first direction, a bottom surface facing in a second direction opposite from the first direction, a first side surface facing in a third direction orthogonal to the first direction, and a second side surface facing in a fourth direction opposite from the third direction. The method also includes forming an insulation layer to have, in the first cross-section, at least one portion of a top surface portion positioned further in the first direction relative to the top surface and a bottom surface portion positioned further in the second direction relative to the bottom surface, a first side surface portion covering the first side surface, a second side surface portion covering the second side surface, a first protrusion protruding from the at least one portion further in the third direction relative to the first side surface portion, and a second protrusion protruding from the at least one portion further in the fourth direction relative to the second side surface portion. The method further includes forming an element body by laminating a first magnetic layer and a second magnetic layer in the first direction to sandwich the small-turn inductor wiring and the insulation layer.

According to the embodiment, the degree of adhesion between the insulation layer and the magnetic layer is increased.

Preferably, in an embodiment of the method of manufacturing an inductor component, the forming a small-turn inductor wiring further includes forming a dummy wiring at a position capable of overlapping the first protrusion or the second protrusion when viewed in the first direction. Also, the method further includes removing the dummy wiring after the forming a small-turn inductor wiring, and the forming an element body further fills a position where the dummy wiring is removed with the first magnetic layer or the second magnetic layer.

According to the embodiment, the magnetic layer that is in adhesion to the first protrusion or the second protrusion may be manufactured at low cost.

With the use of the inductor component and the method of manufacturing the inductor component, each of which is an aspect of the present disclosure, it is possible to increase the degree of adhesion between the element body and the insulation layer and increase the reliability.

DETAILED DESCRIPTION

Figure 1:
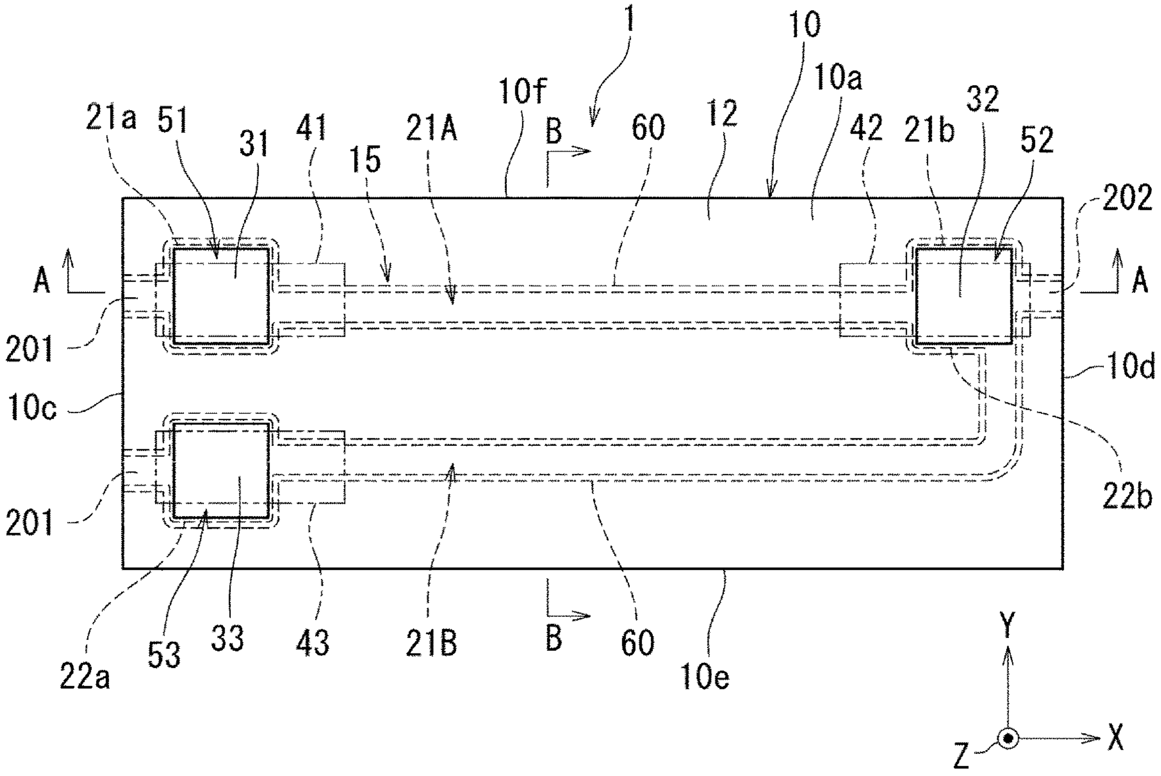
FIG. 1 is a plan view illustrating an inductor component according to a first embodiment.

Hereinafter, an inductor component and a method of manufacturing the inductor component each being an aspect of the present disclosure will be described in detail with reference to embodiments illustrated in the drawings. Note that the drawings may partially include schematic figures and do not reflect actual sizes and ratios in some cases.

First Embodiment

Configuration

Figure 2A:
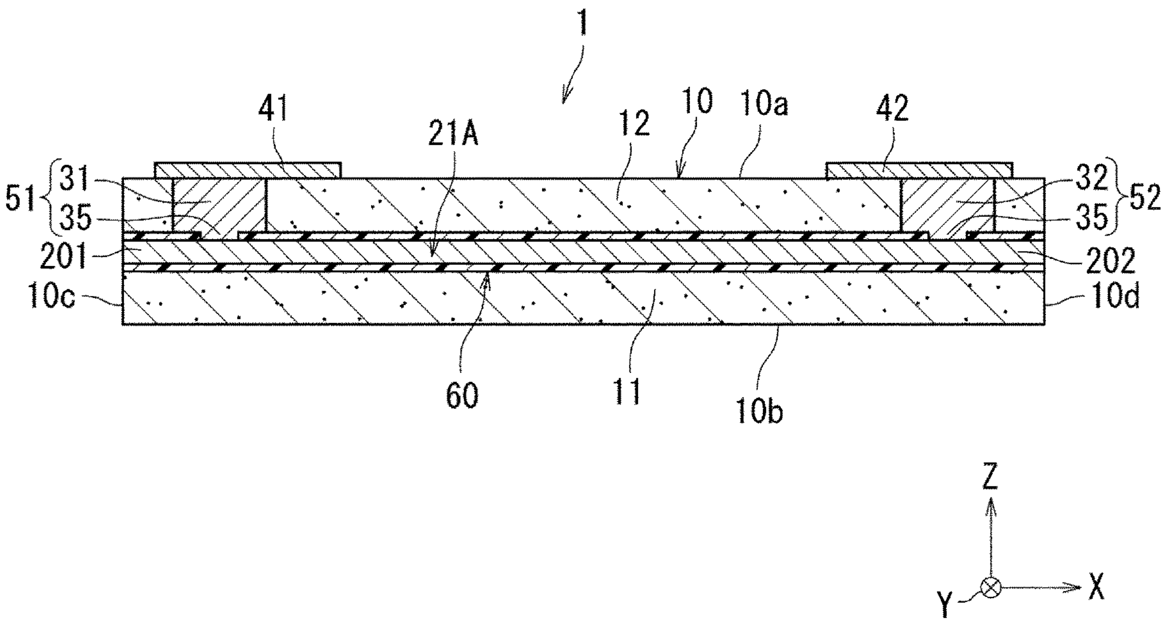
FIG. 2A is a sectional view taken along line A-A in FIG. 1.
Figure 2B:
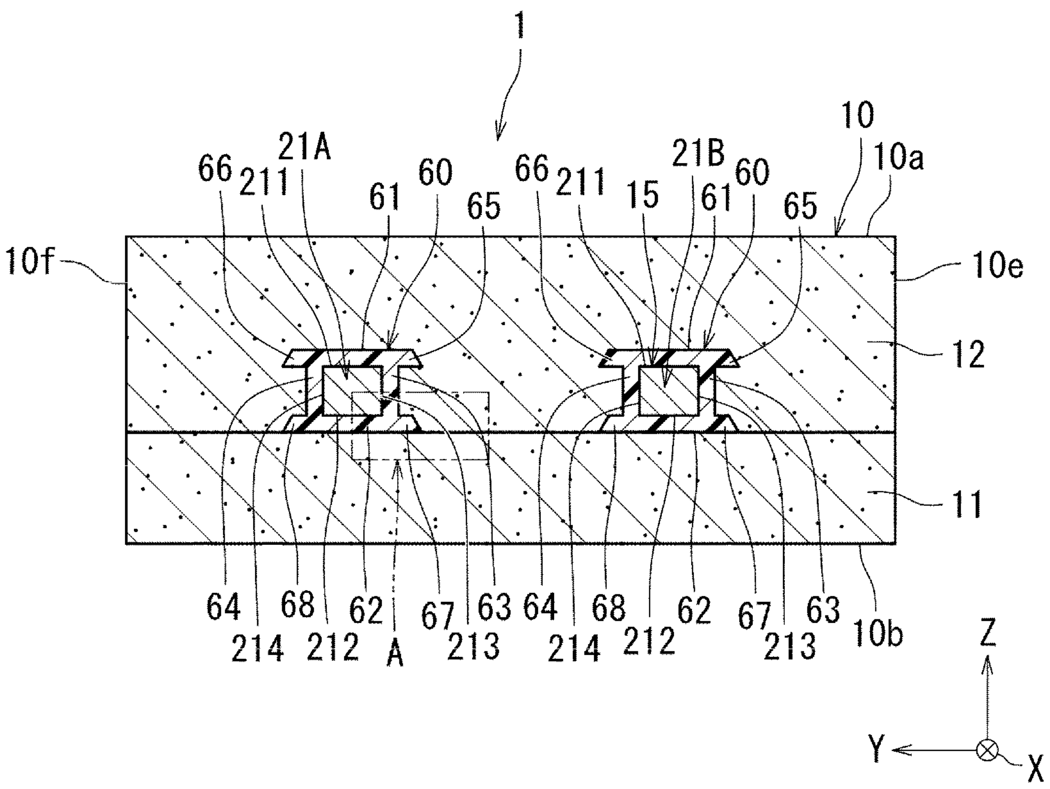
FIG. 2B is a sectional view taken along line B-B in FIG. 1.

FIG. 1 is a plan view illustrating an inductor component according to a first embodiment. FIG. 2A is a sectional view taken along line A-A in FIG. 1. FIG. 2B is a sectional view taken along line B-B in FIG. 1.

An inductor component 1 is used in an electronic device such as a personal computer, a DVD player, a digital camera, a TV, a mobile phone, or car electronics, and is a component having a rectangular parallelepiped shape as a whole, for example. Note that, the shape of the inductor component 1 is not particularly limited, and the inductor component 1 may have a cylindrical shape, a polygonal columnar shape, a truncated cone shape, or a truncated polygonal cone shape.

As illustrated in FIG. 1, FIG. 2A, and FIG. 2B, the inductor component 1 includes an element body 10, a coil 15 disposed in the element body 10, a non-magnetic insulation layer 60 covering at least part of the coil 15, a first vertical wiring 51, a second vertical wiring 52, and a third vertical wiring 53 provided in the element body 10 such that end surfaces thereof are exposed from a first main surface 10*a* of the element body 10, and a first external terminal 41, a second external terminal 42, and a third external terminal 43 exposed at the first main surface 10*a* of the element body 10. In FIG. 1, the first external terminal 41 to the third external terminal 43 are indicated by a dashed and double-dotted line, for convenience.

In the drawings, a thickness direction of the inductor component 1 is defined as a Z-direction, a forward Z-direction indicates an upper side, and a reverse Z-direction indicates a lower side. In a plane orthogonal to the Z-direction of the inductor component 1, a length direction being a longitudinal direction of the inductor component 1 in which the first external terminal 41 and the second external terminal 42 are disposed side by side is defined as an X-direction, and a width direction of the inductor component 1 being a direction orthogonal to the length direction is defined as a Y-direction.

The element body 10 has the first main surface 10*a* and a second main surface 10*b*; and a first side surface 10*c*, a second side surface 10*d*, a third side surface 10*e*, and a fourth side surface 10*f* that are positioned between the first main surface 10*a* and the second main surface 10*b*, and connect the first main surface 10*a* and the second main surface 10*b*.

The first main surface 10*a* and the second main surface 10*b* are arranged opposite from each other in the Z-direction, the first main surface 10*a* is arranged in the forward Z-direction, and the second main surface 10*b* is arranged in the reverse Z-direction. The first side surface 10*c* and the second side surface 10*d* are arranged opposite from each other in the X-direction, the first side surface 10*c* is arranged in a reverse X-direction, and the second side surface 10*d* is arranged in a forward X-direction. The third side surface 10*e* and the fourth side surface 10*f* are arranged opposite from each other in the Y-direction, the third side surface 10*e* is arranged in a reverse Y-direction, and the fourth side surface 10*f* is arranged in a forward Y-direction.

The element body 10 includes a first magnetic layer 11 and a second magnetic layer 12 laminated in order in the forward Z-direction. The term "in order" merely indicates the positional relationship between the first magnetic layer 11 and the second magnetic layer 12, and has no relation to the order of formation of the first magnetic layer 11 and the second magnetic layer 12.

Each of the first magnetic layer 11 and the second magnetic layer 12 includes magnetic powder and a resin containing the magnetic powder. The resin is an organic insulation material made of an epoxy-based resin, a phenol-based resin, a liquid crystal polymer-based resin, a polyimide-based resin, an acrylic-based resin, or a mixture thereof, for example. The magnetic powder is a FeSi-based alloy such as FeSiCr, a FeCo-based alloy, a Fe-based alloy such as NiFe, or an amorphous alloy thereof, for example. Accordingly, in comparison with a magnetic layer made of ferrite, DC superposition characteristics may be improved by the magnetic powder, and since particles of the magnetic powder are insulated from each other by the resin, loss (iron loss) at a high frequency is reduced. Note that the magnetic layer may be made of ferrite, a sintered substance of magnetic powder, or the like and contain no organic resin.

The coil 15 has a first inductor wiring 21A of 0.5 or less turns and a second inductor wiring 21B of 0.5 or less turns. The first inductor wiring 21A and the second inductor wiring 21B each correspond to a "small-turn inductor wiring" described in the claims.

The first inductor wiring 21A and the second inductor wiring 21B extend along a plane orthogonal to the forward Z-direction between the first magnetic layer 11 and the second magnetic layer 12. Specifically, the first magnetic layer 11 is present in the reverse Z-direction of the first inductor wiring 21A and the second inductor wiring 21B, and the second magnetic layer 12 is present in the forward Z-direction of the first inductor wiring 21A and the second inductor wiring 21B and in a direction orthogonal to the forward Z-direction.

When viewed in the Z-direction, the first inductor wiring 21A linearly extends in the X-direction. When viewed in the Z-direction, part of the second inductor wiring 21B linearly extends in the X-direction, and the rest of the second inductor wiring 21B linearly extends in the Y-direction, that is, the second inductor wiring 21B extends in an L-shape.

A thickness of each of the first inductor wiring 21A and the second inductor wiring 21B is preferably 40 μm or more and 120 μm or less (i.e., from 40 μm to 120 μm), for example. As an example of the first inductor wiring 21A and the second inductor wiring 21B, the thickness is 35 μm, a wiring width is 50 μm, and a maximum space between the wirings is 200 μm.

The first inductor wiring 21A and the second inductor wiring 21B are made of a conductive material which includes metal material having low electric resistance, such as Cu, Ag, Au, and Al, for example. In the present embodiment, the inductor component 1 includes only one layer of the first inductor wiring 21A and the second inductor wiring 21B, and a reduction in height of the inductor component 1 may be achieved. Note that the inductor wiring may have a two-layer structure including a seed layer and an electrolytic plating layer, and may include Ti or Ni as the seed layer.

A first end portion 21*a* of the first inductor wiring 21A is electrically connected to the first vertical wiring 51, and a second end portion 21*b* of the first inductor wiring 21A is electrically connected to the second vertical wiring 52. In other words, the first inductor wiring 21A has a pad portion having a large line width at each of the first end portion 21*a* and the second end portion 21*b*, and is directly connected to the first vertical wiring 51 and the second vertical wiring 52 at the pad portion.

A first end portion 22*a* of the second inductor wiring 21B is electrically connected to the third vertical wiring 53, and a second end portion 22*b* of the second inductor wiring 21B is electrically connected to the second vertical wiring 52. That is, the second inductor wiring 21B has a pad portion at the first end portion 22*a*, and is directly connected to the third vertical wiring 53 at the pad portion. The second end portion 22*b* of the second inductor wiring 21B is common to the second end portion 21*b* of the first inductor wiring 21A.

The first end portion 21*a* of the first inductor wiring 21A and the first end portion 22*a* of the second inductor wiring 21B are positioned close to the first side surface 10*c* of the element body 10 when viewed in the Z-direction. The second end portion 21*b* of the first inductor wiring 21A and the second end portion 22*b* of the second inductor wiring 21B are positioned close to the second side surface 10*d* of the element body 10 when viewed in the Z-direction.

A first extended wiring 201 is connected to each of the first end portion 21*a* of the first inductor wiring 21A and the first end portion 22*a* of the second inductor wiring 21B, and the first extended wiring 201 is exposed from the first side surface 10*c*. A second extended wiring 202 is connected to the second end portion 21*b* of the first inductor wiring 21A and the second end portion 22*b* of the second inductor wiring 21B, and the second extended wiring 202 is exposed from the second side surface 10*d*.

The first extended wiring 201 and the second extended wiring 202 are wirings connected to a power supply wiring when electrolytic plating is additionally performed after the shapes of the first inductor wiring 21A and the second inductor wiring 21B are formed in a manufacturing process of the inductor component 1. In a state of an inductor substrate before being separated into individual inductor components 1, electrolytic plating may additionally be performed easily by the power supply wiring, and a distance between the wirings may be narrowed. Further, by additionally performing the electrolytic plating, the distance between the first inductor wiring 21A and the second inductor wiring 21B is narrowed. This makes it possible to increase the magnetic coupling between the first inductor wiring 21A and the second inductor wiring 21B. Further, by providing the first extended wiring 201 and the second extended wiring 202, the strength is ensured at the time of cutting the element body 10 to obtain individual inductor components 1. This makes it possible to increase a yield at the time of manufacturing.

The first vertical wiring 51 to the third vertical wiring 53 extend in the Z-direction from the first and second inductor wirings 21A and 21B, and penetrate through the second magnetic layer 12. The first vertical wiring 51 extends from an upper surface of the first end portion 21*a* of the first inductor wiring 21A to the first main surface 10*a* of the element body 10, and an end surface of the first vertical wiring 51 is exposed from the first main surface 10*a* of the element body 10. The second vertical wiring 52 extends from an upper surface of the second end portion 21*b* of the first inductor wiring 21A to the first main surface 10*a* of the element body 10, and an end surface of the second vertical wiring 52 is exposed from the first main surface 10*a* of the element body 10. The third vertical wiring 53 extends from an upper surface of the first end portion 22*a* of the second inductor wiring 21B to the first main surface 10*a* of the element body 10, and an end surface of the third vertical wiring 53 is exposed from the first main surface 10*a* of the element body 10.

Accordingly, the first vertical wiring 51, the second vertical wiring 52, and the third vertical wiring 53 linearly extend from the first inductor wiring 21A and the second inductor wiring 21B to the end surfaces exposed from the first main surface 10*a*, in a direction orthogonal to the first main surface 10*a*. Thus, the first external terminal 41, the second external terminal 42, and the third external terminal 43 may be connected to the first inductor wiring 21A and the second inductor wiring 21B with a shorter distance, and lower resistance and higher inductance of the inductor component 1 may be achieved. The first vertical wiring 51 to the third vertical wiring 53 are made of a conductive material, that is, the same material as that of the inductor wirings 21A and 21B, for example.

The first vertical wiring 51 includes a via wiring 35 penetrating through the inside of the insulation layer 60, and a first columnar wiring 31 extending upward from the via wiring 35 and penetrating through the inside of the second magnetic layer 12. The second vertical wiring 52 includes the via wiring 35 penetrating through the inside of the insulation layer 60, and a second columnar wiring 32 extending upward from the via wiring 35 and penetrating through the inside of the second magnetic layer 12. The third vertical wiring 53 includes the via wiring 35 penetrating through the inside of the insulation layer 60, and a third columnar wiring 33 extending upward from the via wiring 35 and penetrating through the inside of the second magnetic layer 12. The via wiring 35 is a conductor having a smaller line width (diameter, sectional area) than the columnar wirings 31 to 33.

The first external terminal 41 to the third external terminal 43 are provided on the first main surface 10*a* of the element body 10. The first external terminal 41 to the third external terminal 43 are made of a conductive material and have a three-layer configuration in which Cu having low electrical resistance and excellent stress resistance, Ni having excellent corrosion resistance, and Au having excellent solder wettability and reliability, for example, are arranged in this order from the inner side portion toward the outer side portion.

The first external terminal 41 is in contact with the end surface of the first vertical wiring 51 exposed from the first main surface 10*a* of the element body 10, and is electrically connected to the first vertical wiring 51. Thus, the first external terminal 41 is electrically connected to the first end portion 21*a* of the first inductor wiring 21A. The second external terminal 42 is in contact with the end surface of the second vertical wiring 52 exposed from the first main surface 10*a* of the element body 10, and is electrically connected to the second vertical wiring 52. Thus, the second external terminal 42 is electrically connected to the second end portion 21*b* of the first inductor wiring 21A and the second end portion 22*b* of the second inductor wiring 21B. The third external terminal 43 is in contact with the end surface of the third vertical wiring 53 to be electrically connected to the third vertical wiring 53, and is electrically connected to the first end portion 22*a* of the second inductor wiring 21B.

The insulation layer 60 is made of an insulation material not containing a magnetic substance. The insulation layer 60 is, for example, an organic resin such as an epoxy resin, a phenol resin, a polyimide resin, a liquid crystal polymer, or a combination thereof; a sintered substance such as glass or alumina; or a thin film such as a silicon oxide film, a silicon nitride film, or a silicon oxynitride film.

As illustrated in FIG. 2B, in a first cross-section orthogonal to the extending direction of the first inductor wiring 21A and the second inductor wiring 21B, the first inductor wiring 21A and the second inductor wiring 21B each have a top surface 211 facing in the forward Z-direction, a bottom surface 212 facing in the Z-direction, a first side surface 213 facing in the reverse Y-direction, and a second side surface 214 facing in the Y-direction.

The forward Z-direction corresponds to a "first direction" in the claims, the reverse Z-direction corresponds to a "second direction opposite from the first direction" in the claims, the reverse Y-direction corresponds to a "third direction orthogonal to the first direction" in the claims, and the Y-direction corresponds to a "fourth direction opposite from the third direction" in the claims. Hereinafter, the directions may be referred to as first to fourth directions.

Insulation layer 60 has a top surface portion 61 positioned further in the first direction relative to the top surface 211, a bottom surface portion 62 positioned further in the second direction relative to the bottom surface 212, a first side surface portion 63 covering the first side surface 213, a second side surface portion 64 covering the second side surface 214, a top surface side first protrusion 65 protruding from the top surface portion 61 further in the third direction relative to the first side surface portion 63, a top surface side second protrusion 66 protruding from the top surface portion 61 further in the fourth direction relative to the second side surface portion 64, a bottom surface side first protrusion 67 protruding from the bottom surface portion 62 further in the third direction relative to the first side surface portion 63, and a bottom surface side second protrusion 68 protruding from the bottom surface portion 62 further in the fourth direction relative to the second side surface portion 64. The top surface portion 61 is in contact with the top surface 211, the first side surface portion 63, and the second side surface portion 64, and the bottom surface portion 62 is in contact with the bottom surface 212, the first side surface portion 63, and the second side surface portion 64.

With the configuration described above, having the first protrusions 65 and 67 and the second protrusions 66 and 68 may increase the contact area between the insulation layer 60 and the element body 10. Further, the first protrusions 65 and 67 and the second protrusions 66 and 68 may be made to enter the element body 10. Thus, a degree of adhesion between the insulation layer 60 and the element body 10 is increased, and the reliability of the inductor component 1 may be increased.

Specifically, each of the first inductor wiring 21A and the second inductor wiring 21B has 0.5 or less turns, which makes the curved portion be shorter than that of an inductor wiring of one or more turns, and thus, has a shape that is not completely wound. Accordingly, if the first protrusions 65 and 67 and the second protrusions 66 and 68 are not provided, the orientation of a contact surface between the insulation layer covering the inductor wiring and the element body is uneven in the inductor wiring of 0.5 or less turns as compared with the inductor wiring of one or more turns. This may cause a possibility that the degree of adhesion between the insulation layer and the element body in a specific direction decreases.

Whereas, having the first protrusions 65 and 67 and the second protrusions 66 and 68 may decrease the unevenness of the direction of a contact surface between the insulation layer 60 covering the first inductor wiring 21A and the second inductor wiring 21B and the element body 10. This makes it possible to increase the degree of adhesion between the insulation layer 60 and the element body 10 in a specific direction.

Accordingly, even when the element body 10 and the insulation layer 60 expand or contract due to, for example, a thermal load, the generation of a gap between the insulation layer 60 and the element body 10 may be suppressed. This makes it possible to prevent moisture from entering the gap and to suppress the deterioration of the inductor component 1.

Preferably, in the first cross-section, the length of at least one of the first protrusions 65 and 67 is different from the length of at least one of the second protrusions 66 and 68. In the case above, the length of at least one of the first protrusions 65 and 67 may be different from the length of at least one of the second protrusions 66 and 68 in the same insulation layer 60, or the length of at least one of the first protrusions 65 and 67 may be different from the length of at least one of the second protrusions 66 and 68 in all the insulation layers 60.

With the configuration described above, by increasing the length of one of the first and second protrusions, the degree of adhesion between the insulation layer 60 and the element body 10 may further be increased. Further, by decreasing the length of the other of the first and second protrusions, the magnetic resistance of the magnetic path may be reduced and the inductance acquisition efficiency may be increased.

Preferably, in the first cross-section, the length of the first protrusions 65 and 67 is the same as the length of the second protrusions 66 and 68. In the case above, the length of the first protrusions 65 and 67 may be the same as the length of the second protrusions 66 and 68 in the same insulation layer 60, or the length of the first protrusions 65 and 67 may be the same as the length of the second protrusions 66 and 68 in all the insulation layers 60.

With the configuration described above, by making the lengths of the first and second protrusions equal to each other, the insulation layer 60 may easily be manufactured.

Figure 3:
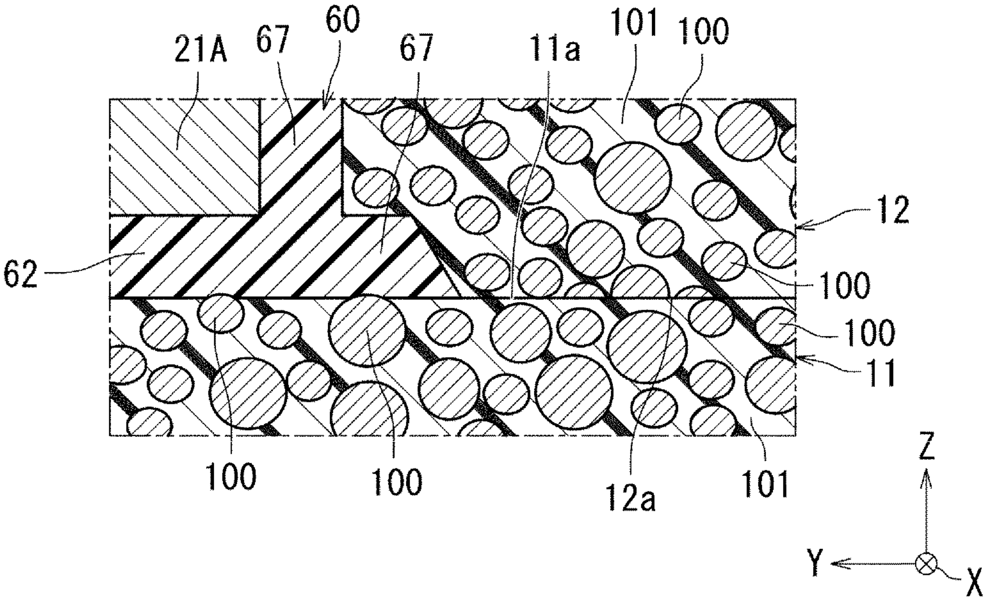
FIG. 3 is an enlarged view of a portion A in FIG. 2B.

FIG. 3 is an enlarged view of a portion A in FIG. 2B. As illustrated in FIG. 3, each of the first magnetic layer 11 and the second magnetic layer 12 includes magnetic powder 100 and a resin 101 containing the magnetic powder 100. Preferably, a contact surface 12*a* of the second magnetic layer 12 with the first magnetic layer 11 includes a sectional plane of the magnetic powder 100, and a contact surface 11*a* of the first magnetic layer 11 with the second magnetic layer 12 includes a surface of the magnetic powder 100.

With the configuration described above, since the contact surface 12*a* of the second magnetic layer 12 may be made flat, when the filling with the first magnetic layer 11 is performed toward the second magnetic layer 12 at the time of manufacturing, a pressure may easily be transmitted to the first magnetic layer 11. Accordingly, the filling rate of the magnetic powder 100 in the first magnetic layer 11 may be increased, and as a result, the inductance increases.

Although the insulation layer has a top surface portion and a bottom surface portion in the first embodiment, it is sufficient that an insulation layer has at least one portion of the top surface portion and the bottom surface portion, and that a first protrusion and a second protrusion protrude from the at least one portion.

In the first embodiment, the inductor wiring has one layer, but may have two or more layers. When the inductor wiring has one layer, the thickness of the inductor component may be made small. When the inductor wiring has two or more layers, the number of turns of the inductor wiring may be increased, so that the inductance may be increased. Note that when the inductor wiring has two or more layers, it is sufficient that at least one of the inductor wirings is a small-turn inductor wiring. That is, it is sufficient that at least one of the inductor wirings has 0.5 or less turns, and other inductor wirings may have more than 0.5 turns, or 0.5 or less turns.

Here, for example, when the number of inductor wirings is increased, the inductor wirings may be laminated in order of a first layer, a second layer and up to an m-th layer (m is a natural number of three or more). At this time, the first direction (lamination direction) is determined by, for example, a shape of the wiring. For example, the inductor wiring has a flat bottom surface and a curved top surface in most cases because of the manufacturing process. Accordingly, since the next layer is sequentially laminated on a curved surface side of the inductor wiring, the first direction may be referred to as a direction from a flat surface side toward a curved surface side of the inductor wiring. For example, a diameter of a via wiring connecting the inductor wirings to each other is larger on a top surface side than on a bottom surface side because of the manufacturing process. Accordingly, since the inductor wiring is laminated on the via wiring at which the diameter of the via wiring is larger, the first direction may be referred to as a direction from a connection surface on a side in which the diameter of the via wiring is smaller toward a connection surface on a side in which the diameter is larger. For example, when the inductor wiring is formed using a seed layer, the first direction may be referred to as a direction from a side in which the seed layer is present toward a side in which the seed layer is not present. The method of determining the first direction described above may also be applied to a case including one layer.

Manufacturing Method

Next, a method of manufacturing the inductor component 1 will be described. FIG. 4A to FIG. 4J correspond to a B-B section in FIG. 1 (FIG. 2B).

Figure 4A:
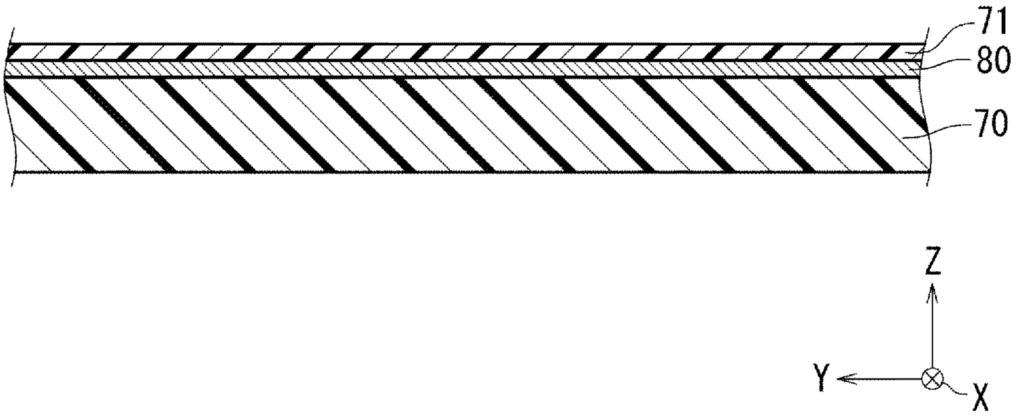
FIG. 4A is a diagram for describing a method of manufacturing an inductor component.

As illustrated in FIG. 4A, a base substrate 70 is prepared. The base substrate 70 is made of an inorganic material such as ceramic, glass, or silicon, for example. A copper foil 80 is provided on a main surface of the base substrate 70, a first insulation layer 71 is applied on the copper foil 80, and the first insulation layer 71 is cured.

Figure 4B:
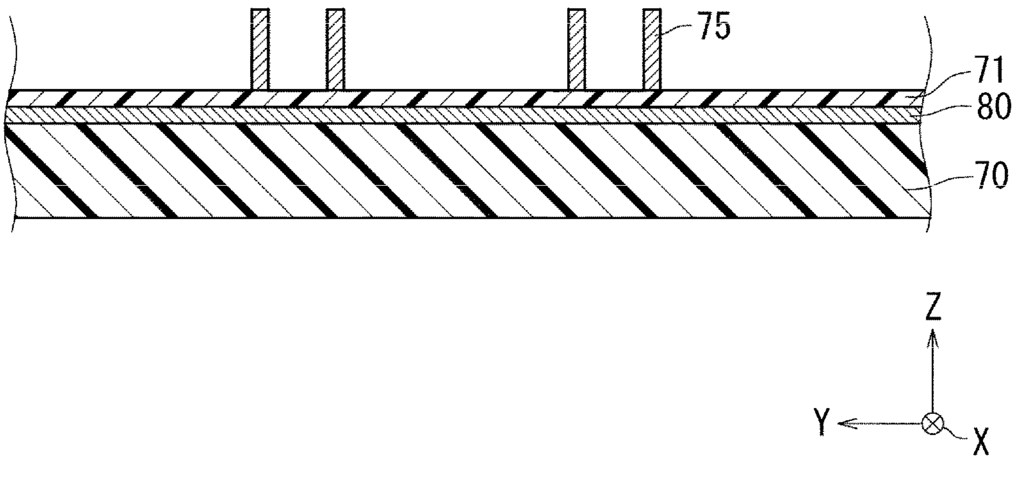
FIG. 4B is a diagram for describing the method of manufacturing the inductor component.

As illustrated in FIG. 4B, a seed layer (Ti/Cu: not illustrated) is formed on the first insulation layer 71 by a known method such as a sputtering method or a vapor deposition method. Thereafter, a dry film resist (DFR) 75 is attached, and a predetermined pattern is formed on the DFR 75 by using a photolithography method.

Figure 4C:
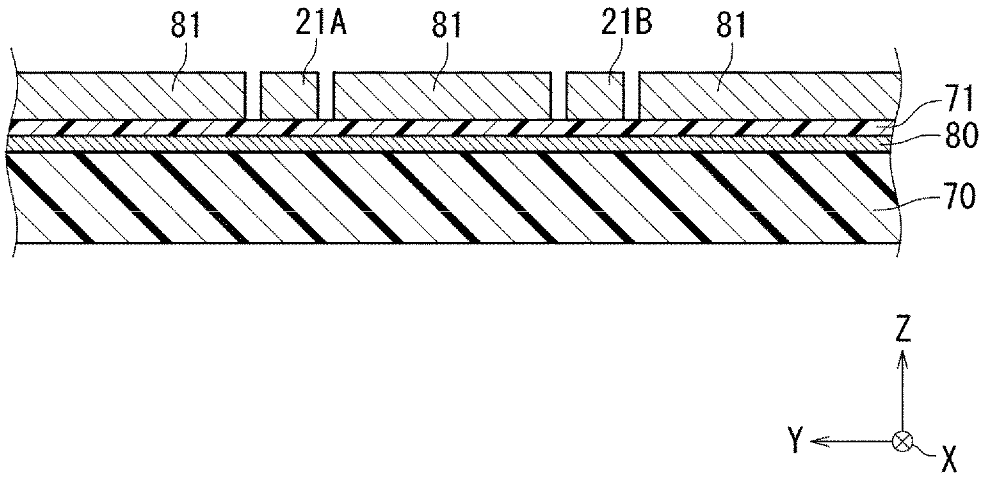
FIG. 4C is a diagram for describing the method of manufacturing the inductor component.

As illustrated in FIG. 4C, the first inductor wiring 21A, the second inductor wiring 21B, and a dummy wiring 81 are formed on the first insulation layer 71 by using an electrolytic plating method while feeding electricity to the seed layer. Thereafter, the DFR 75 is stripped and the seed layer is etched. With this, gaps are provided between the first inductor wiring 21A, the second inductor wiring 21B, and the dummy wiring 81.

Figure 4D:
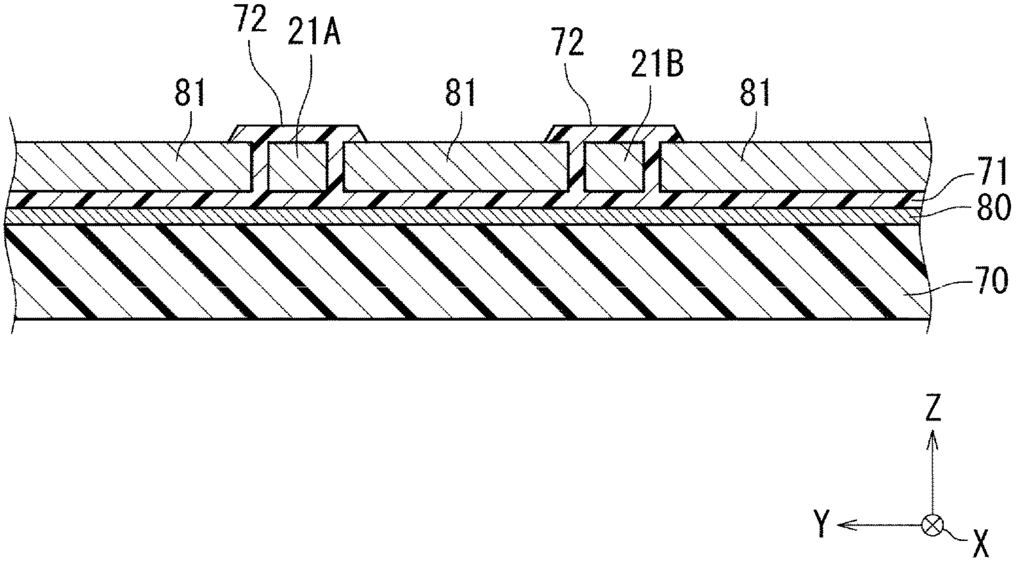
FIG. 4D is a diagram for describing the method of manufacturing the inductor component.

As illustrated in FIG. 4D, a second insulation layer 72 is applied on the first inductor wiring 21A, the second inductor wiring 21B, and the dummy wiring 81 and cured. At this time, the gap is also filled with the second insulation layer 72. Thereafter, an opening portion is formed by irradiating the second insulation layer 72 with a laser such that the dummy wiring 81 is exposed. At this time, part of the second insulation layer 72 is made to overlap the dummy wiring 81. The overlapping portions of the second insulation layer 72 correspond to a top surface side first protrusion and a top surface side second protrusion. Here, a center portion of the second insulation layer 72 on the dummy wiring 81 need not be removed, and for example, an annular opening portion may be formed by irradiating an outer periphery of the dummy wiring 81 with a laser. With this, a laser irradiation time may be shortened. Note that the center portion of the second insulation layer 72 on the dummy wiring 81 may be removed by being lifted off at the time of removing the dummy wiring 81.

Thereafter, although not illustrated, an opening portion is formed in the second insulation layer 72 such that part of the first inductor wiring 21A and part of the second inductor wiring 21B are exposed, and a seed layer is formed on the second insulation layer 72. A DFR is attached again, and a predetermined pattern is formed on the DFR by using a photolithography method. The predetermined pattern is a through-hole corresponding to a position where the first columnar wiring 31, the second columnar wiring 32, and the third columnar wiring 33 are to be provided on the first inductor wiring 21A and the second inductor wiring 21B. The via wiring 35, the first columnar wiring 31, the second columnar wiring 32, and the third columnar wiring 33 are formed on the first inductor wiring 21A and the second inductor wiring 21B by using electrolytic plating. Thereafter, the DFR is stripped and the seed layer is etched.

Figure 4E:
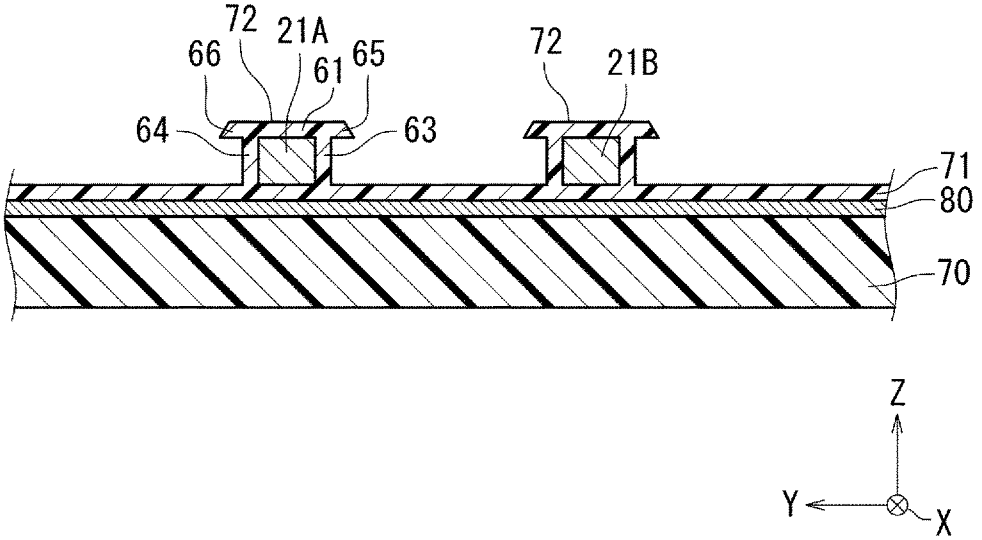
FIG. 4E is a diagram for describing the method of manufacturing the inductor component.

Then, a DFR is provided to protect the first columnar wiring 31, the second columnar wiring 32, and the third columnar wiring 33, and thereafter, the dummy wiring 81 is etched to strip the DFR as illustrated in FIG. 4E. Thus, the top surface portion 61, the top surface side first protrusion 65, the top surface side second protrusion 66, the first side surface portion 63, and the second side surface portion 64 of the insulation layer 60 are formed.

Figure 4F:
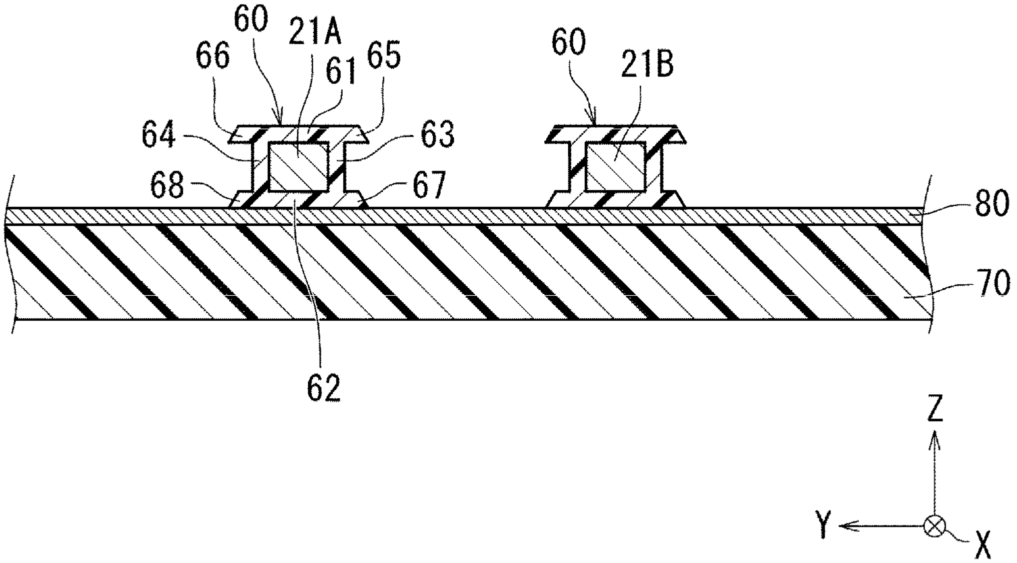
FIG. 4F is a diagram for describing the method of manufacturing the inductor component.

As illustrated in FIG. 4F, an opening portion is formed by irradiating part of the first insulation layer 71 with a laser. Thus, the bottom surface portion 62, the bottom surface side first protrusion 67, and the bottom surface side second protrusion 68 of the insulation layer 60 are formed. At this time, the copper foil 80 is used as a laser stop layer. Note that, instead of providing the copper foil 80, an opening portion may be formed in the first insulation layer 71 by a laser for each portion of the base substrate, or the first insulation layer 71 may be patterned by a patterning process such as a laser or photolithography from the beginning.

Figure 4G:
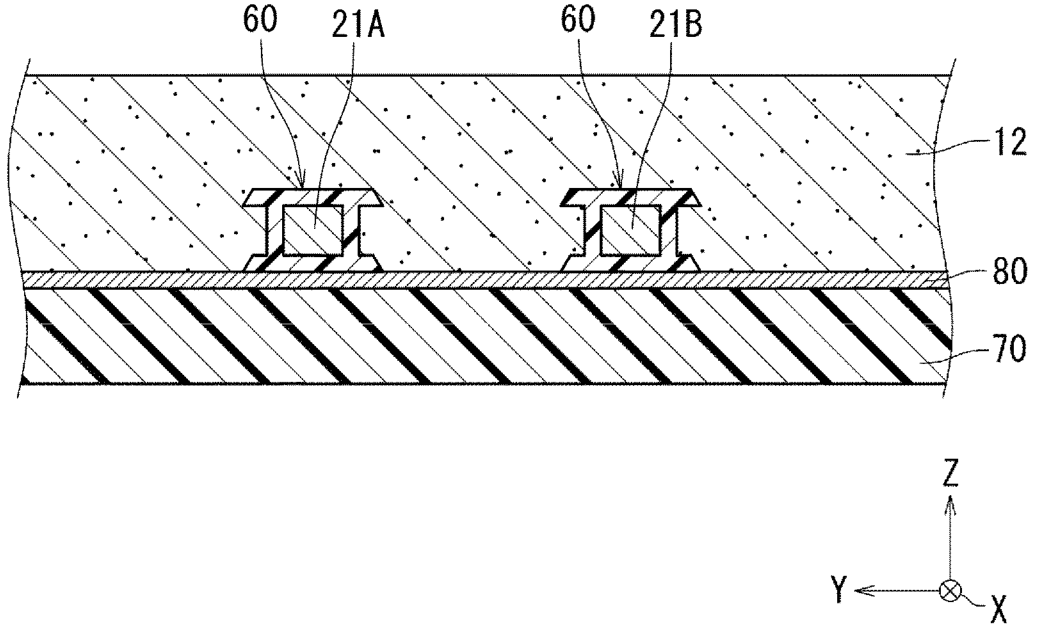
FIG. 4G is a diagram for describing the method of manufacturing the inductor component.

As illustrated in FIG. 4G, a magnetic sheet to be the second magnetic layer 12 is pressure bonded from above the main surface of the base substrate 70 toward the first inductor wiring 21A and the second inductor wiring 21B. Thus, the first inductor wiring 21A, the second inductor wiring 21B, the first columnar wiring 31, the second columnar wiring 32, and the third columnar wiring 33 are covered by the second magnetic layer 12. Thereafter, the upper surface of the second magnetic layer 12 is polished to expose the end surfaces of the first columnar wiring 31, the second columnar wiring 32, and the third columnar wiring 33 from the upper surface of the second magnetic layer 12.

Figure 4H:
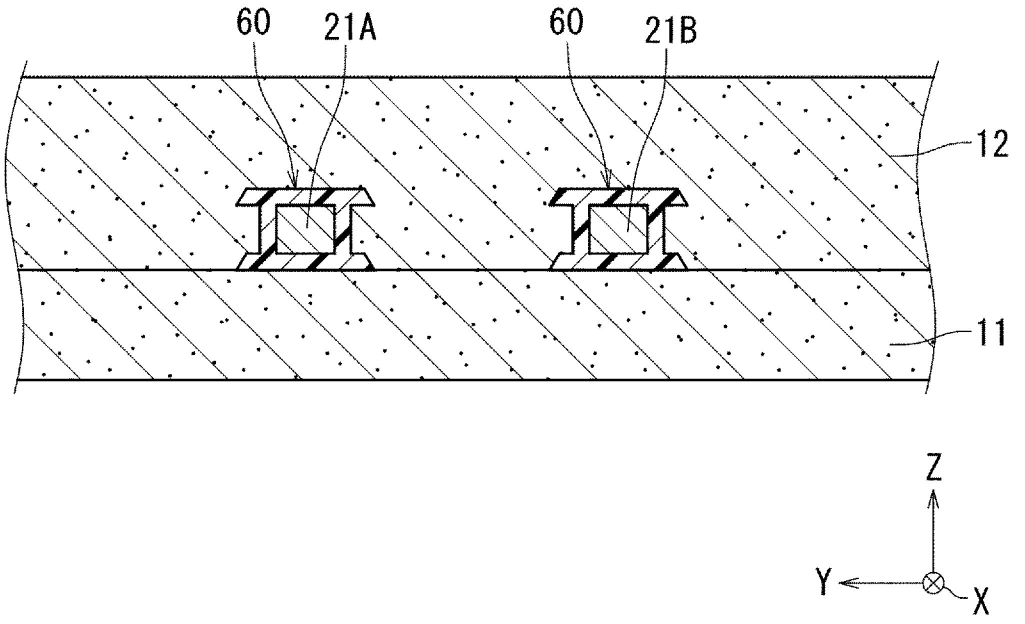
FIG. 4H is a diagram for describing the method of manufacturing the inductor component.

As illustrated in FIG. 4H, the base substrate 70 and the copper foil 80 are removed by polishing. At this time, part of the first insulation layer 71 may also be removed. Thereafter, another magnetic sheet to be the first magnetic layer 11 is pressure bonded from below the first inductor wiring 21A and the second inductor wiring 21B toward the first inductor wiring 21A and the second inductor wiring 21B. Thus, the first inductor wiring 21A and the second inductor wiring 21B are covered by the first magnetic layer 11. Thereafter, the first magnetic layer 11 is polished to a predetermined thickness.

Figure 4I:
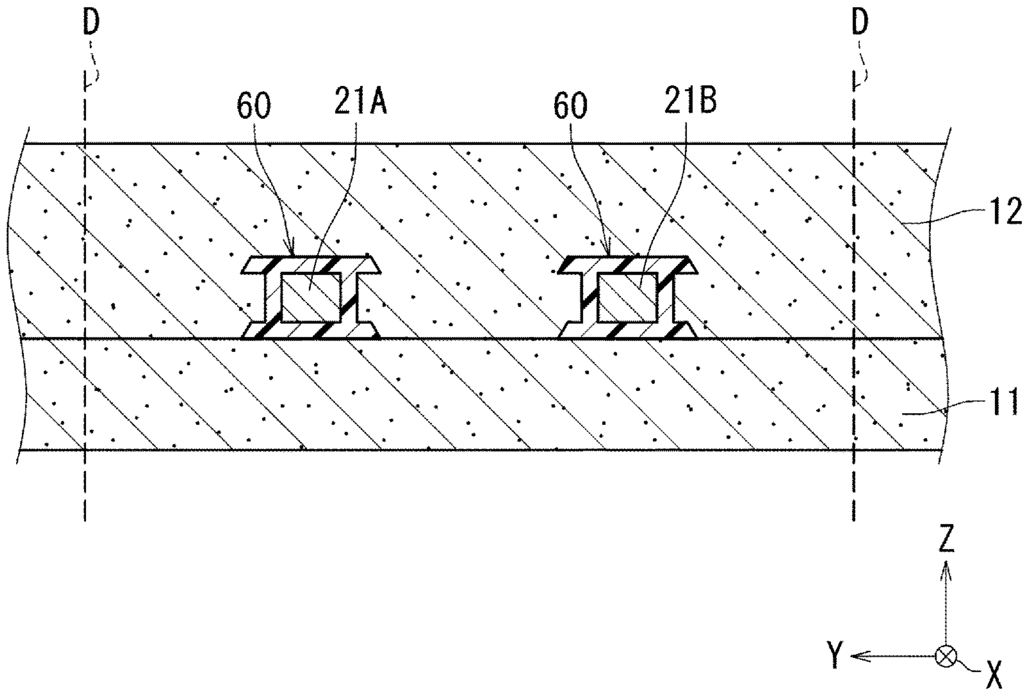
FIG. 4I is a diagram for describing the method of manufacturing the inductor component.
Figure 4J:
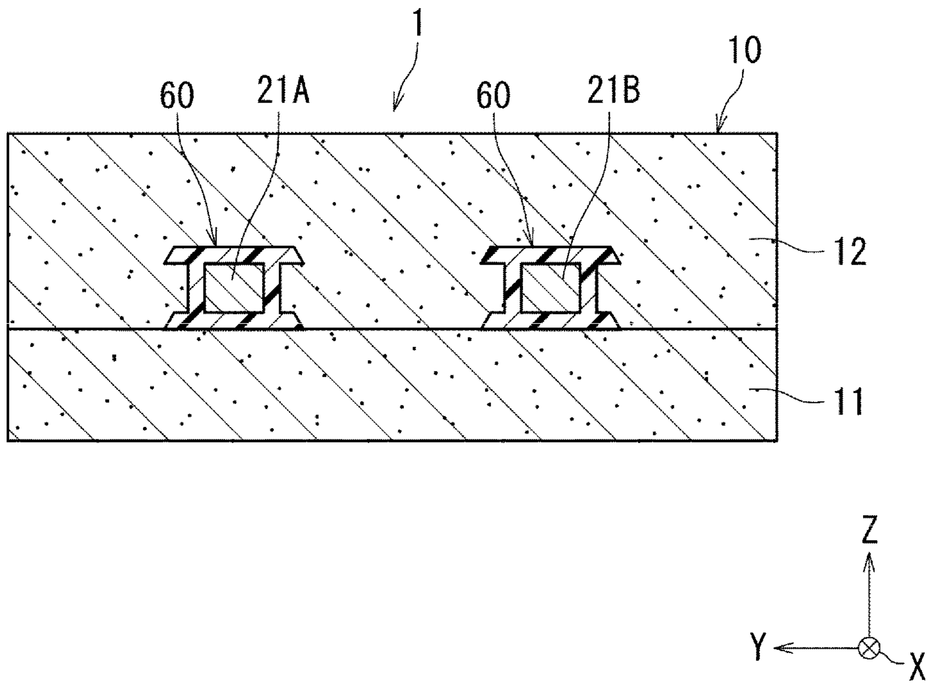
FIG. 4J is a diagram for describing the method of manufacturing the inductor component.

As illustrated in FIG. 4I, an individual inductor component 1 is obtained by cutting along the cut lines D, and then the first external terminal 41, the second external terminal 42, and the third external terminal 43 are formed. Thus, as illustrated in FIG. 4J, the inductor component 1 is manufactured.

As described above, the method of manufacturing the inductor component includes the process of forming the first inductor wiring 21A and the second inductor wiring 21B, the process of forming the insulation layer 60, and the process of forming the element body 10.

In the process of forming the first inductor wiring 21A and the second inductor wiring 21B, in the first cross-section orthogonal to the extending direction, the first inductor wiring 21A and the second inductor wiring 21B of 0.5 or less turns each having a top surface, a bottom surface, a first side surface, and a second side surface are formed.

In the process of forming the insulation layer 60, in the first cross-section, the insulation layer 60 is formed to have the top surface portion 61, the bottom surface portion 62, the first side surface portion 63, the second side surface portion 64, the top surface side first protrusion 65, the top surface side second protrusion 66, the bottom surface side first protrusion 67, and the bottom surface side second protrusion 68.

In the process of forming the element body 10, the element body 10 is formed by laminating the first magnetic layer 11 and the second magnetic layer 12 in the first direction to sandwich the first inductor wiring 21A and the second inductor wiring 21B.

With the configuration described above, a degree of adhesion between the insulation layer 60 and the magnetic layers 11 and 12 is increased.

Preferably, in the process of forming the first inductor wiring 21A and the second inductor wiring 21B, the dummy wiring 81 is further formed at a position that may overlap the first protrusion 65 or the second protrusion 66 when viewed in the first direction. The process of removing the dummy wiring 81 is further included after the process of forming the first inductor wiring 21A and the second inductor wiring 21B. In the process of forming the element body 10, the position where the dummy wiring 81 is removed is filled with the second magnetic layer 12. Note that, the position where the dummy wiring 81 is removed may be filled with the first magnetic layer 11 instead of the second magnetic layer 12.

With the configuration described above, it is possible to manufacture the magnetic layer that is in adhesion to the first protrusion 65 or the second protrusion 66 at low cost.

Second Embodiment

Figure 5A:
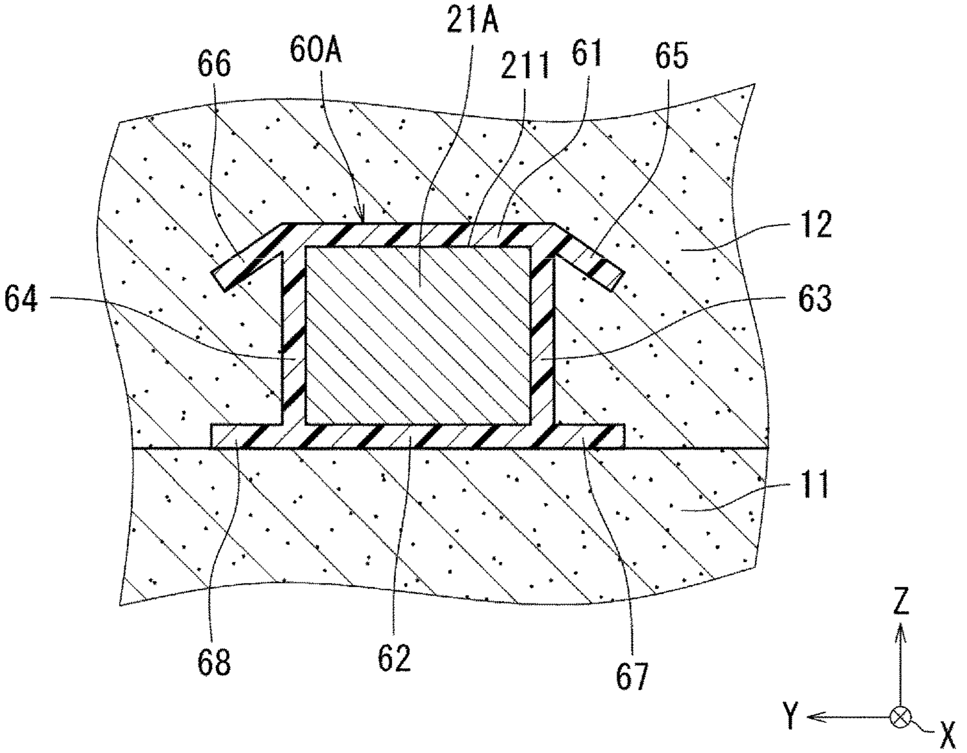
FIG. 5A is a sectional view illustrating an inductor component according to a second embodiment.
Figure 5B:
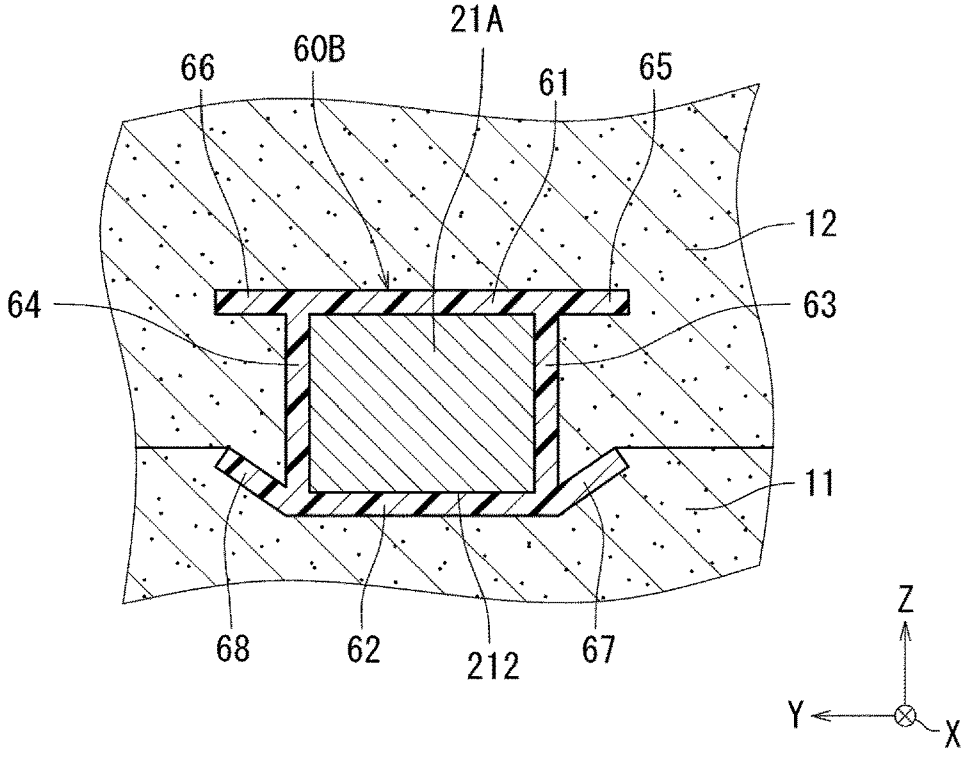
FIG. 5B is a sectional view illustrating the inductor component according to the second embodiment.

FIG. 5A and FIG. 5B are sectional views illustrating an inductor component according to a second embodiment. The second embodiment is different from the first embodiment in a slope of the protrusion. This different configuration will be described below. Other configurations are the same as those of the first embodiment, and are denoted by the same reference signs as those of the first embodiment, and a description thereof will be omitted.

As illustrated in FIG. 5A, in an insulation layer 60A, a top surface side first protrusion 65 and a top surface side second protrusion 66 are slanted in the second direction (reverse Z-direction) in the first cross-section. The top surface side first protrusion 65 and the top surface side second protrusion 66 are positioned further in the second direction relative to the top surface 211 of the first inductor wiring 21A.

With the configuration described above, since the top surface side first protrusion 65 and the top surface side second protrusion 66 are slanted in the second direction, when the coil 15 is filled with the second magnetic layer 12 in the second direction from the first direction side of the coil 15 at the time of manufacturing, the filling the coil 15 with the second magnetic layer 12 becomes smooth. Further, because of the slope of the top surface side first protrusion 65 and the top surface side second protrusion 66 in the second direction, it is possible to prevent the second magnetic layer 12 from coming off in the first direction after the filling the coil 15 with the second magnetic layer 12, and a degree of adhesion between the insulation layer 60A and the element body 10 may further be increased.

Note that, in all of the first protrusions and the second protrusions, it is sufficient that at least one of the first protrusion and the second protrusion is slanted in the second direction.

Alternatively, as illustrated in FIG. 5B, in the insulation layer 60B, a bottom surface side first protrusion 67 and a bottom surface side second protrusion 68 may be slanted in the first direction (Z-direction) in the first cross-section. The bottom surface side first protrusion 67 and the bottom surface side second protrusion 68 are positioned further in the first direction relative to the bottom surface 212 of the first inductor wiring 21A.

With the configuration described above, since the bottom surface side first protrusion 67 and the bottom surface side second protrusion 68 are slanted in the first direction, when the coil 15 is filled with the first magnetic layer 11 in the first direction from the second direction side of the coil 15 at the time of manufacturing, the filling the coil 15 with the first magnetic layer 11 becomes smooth. Further, because of the slope of the bottom surface side first protrusion 67 and the bottom surface side second protrusion 68 in the first direction, it is possible to prevent the first magnetic layer 11 from coming off in the second direction after the filling the coil 15 with the first magnetic layer 11, and a degree of adhesion between the insulation layer 60B and the element body 10 may further be increased.

Note that, in all of the first protrusion and the second protrusion, it is sufficient that at least one of the first protrusion and the second protrusion is slanted in the first direction.

Third Embodiment

Figure 6:
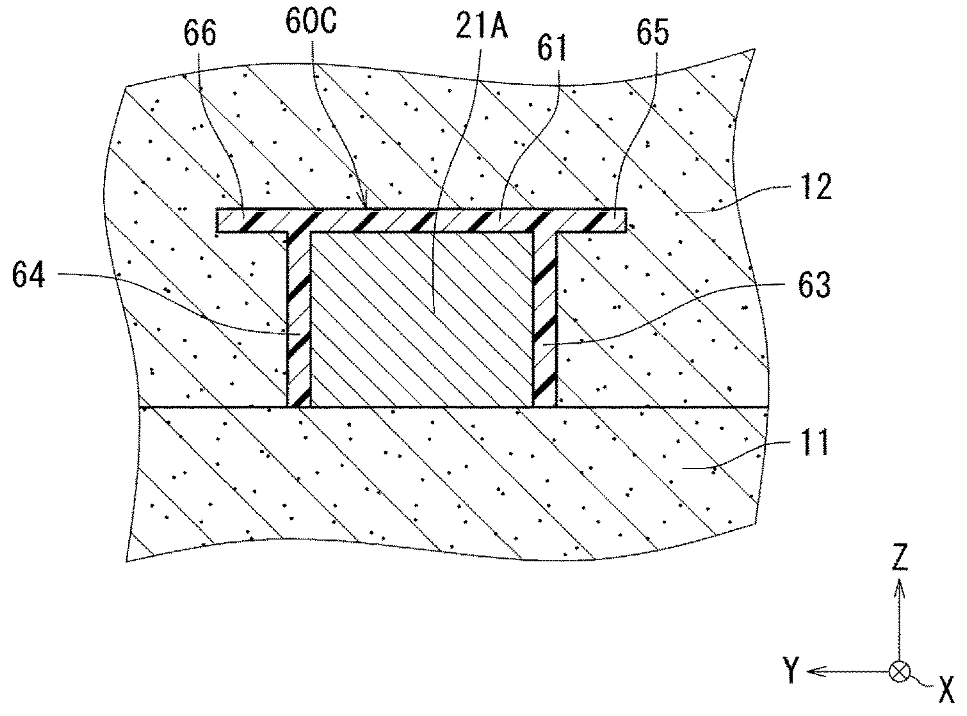
FIG. 6 is a sectional view illustrating an inductor component according to a third embodiment.

FIG. 6 is a sectional view illustrating an inductor component according to a third embodiment. The third embodiment is different from the first embodiment in the configuration of an insulation layer. This different configuration will be described below. Other configurations are the same as those of the first embodiment, and are denoted by the same reference signs as those of the first embodiment, and a description thereof will be omitted.

As illustrated in FIG. 6, in an insulation layer 60C, the bottom surface portion 62, the bottom surface side first protrusion 67, and the bottom surface side second protrusion 68 of the insulation layer 60 of the first embodiment do not exist. That is, the insulation layer 60C has a top surface portion 61, a bottom surface portion 62, a first side surface portion 63, a second side surface portion 64, a top surface side first protrusion 65, and a top surface side second protrusion 66.

With the configuration described above, since the top surface side first protrusion 65 and the top surface side second protrusion 66 are provided as in the first embodiment, the contact area between the insulation layer 60 and the element body 10 may be increased by the top surface side first protrusion 65 and the top surface side second protrusion 66, and the top surface side first protrusion 65 and the top surface side second protrusion 66 may be made to enter the element body 10. Thus, a degree of adhesion between the insulation layer 60C and the element body 10 is increased, and the reliability of the inductor component may be increased.

Further, since the volume of the insulation layer 60C may be reduced, the volume of the magnetic layer may be increased to increase the inductance.

A method of manufacturing the inductor component having the above configuration will be described.

In FIG. 4H of the first embodiment, the base substrate 70 and the copper foil 80 are removed by polishing. At this time, the first insulation layer is removed. That is, the bottom surface portion, the bottom surface side first protrusion, and the bottom surface side second protrusion of the insulation layer are removed.

Note that, in the insulation layer, without providing the top surface portion, the top surface side first protrusion, and the top surface side second protrusion of the insulation layer of the first embodiment, the bottom surface portion, the first side surface portion, the second side surface portion, the bottom surface side first protrusion, and the bottom surface side second protrusion may be provided.

Fourth Embodiment

Figure 7:
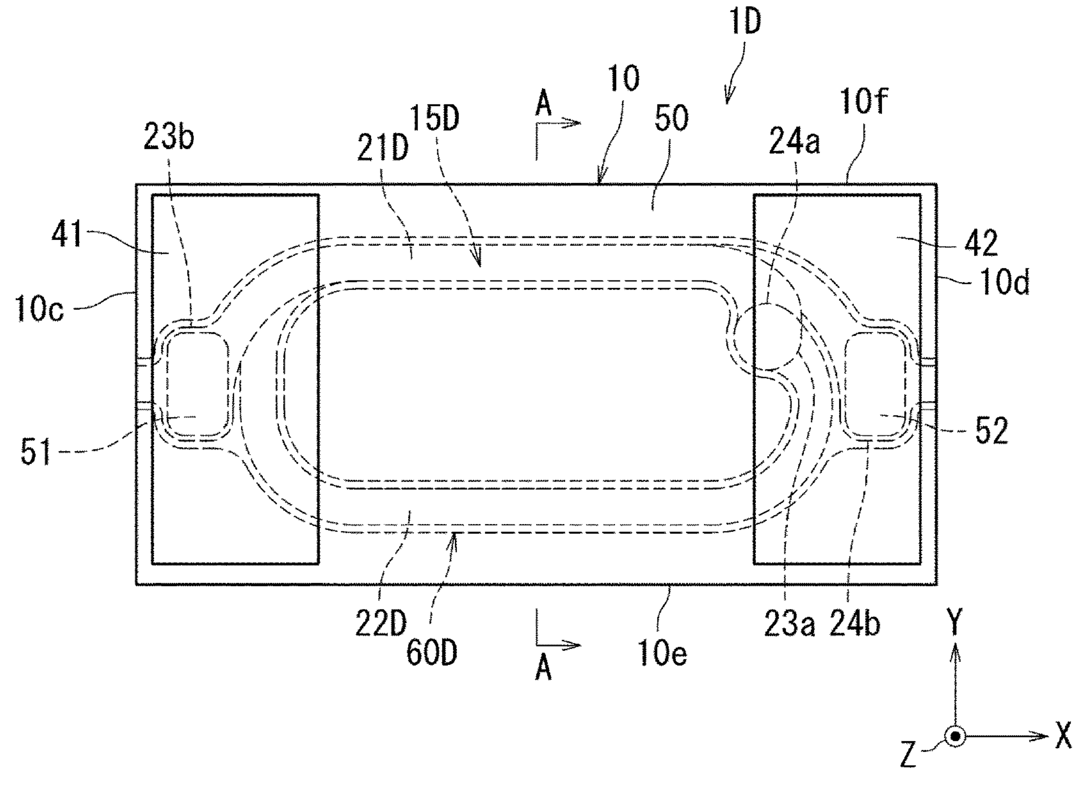
FIG. 7 is a plan view illustrating an inductor component according to a fourth embodiment.
Figure 8:
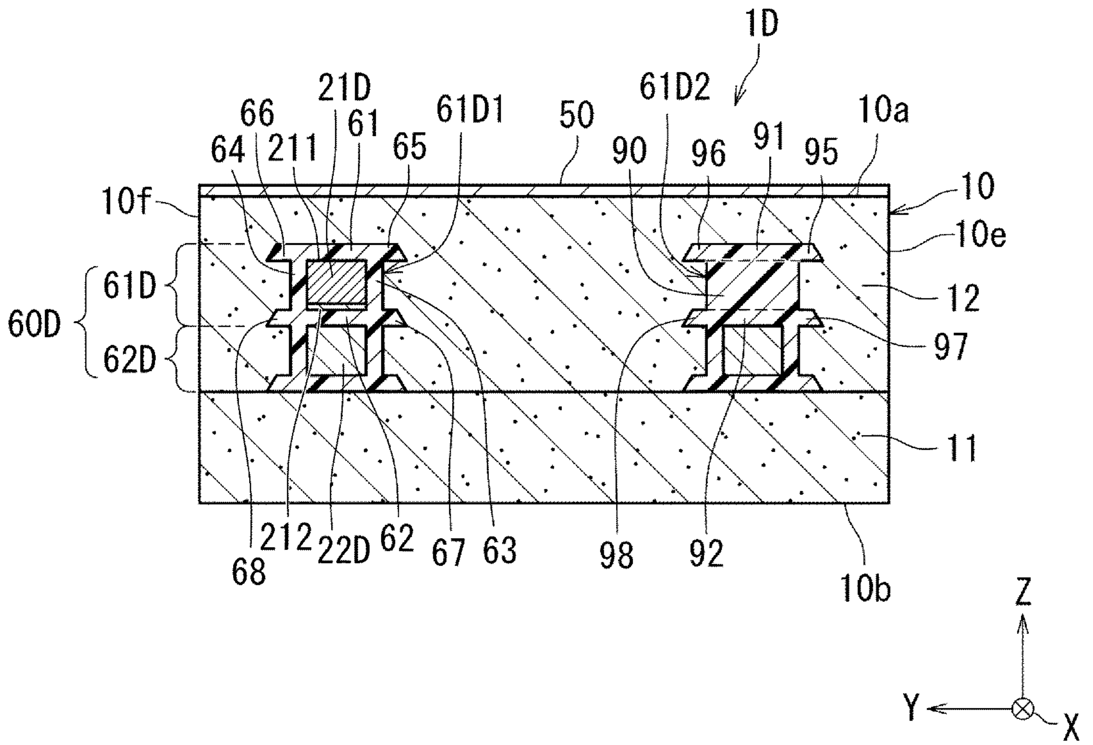
FIG. 8 is a sectional view taken along line A-A in FIG. 7.

FIG. 7 is a plan view illustrating an inductor component according to a fourth embodiment. FIG. 8 is a sectional view taken along line A-A in FIG. 7. The fourth embodiment is different from the first embodiment mainly in the configuration of a coil and an insulation layer. This different configuration will be described below. Other configurations are the same as those of the first embodiment, and are denoted by the same reference signs as those of the first embodiment, and a description thereof will be omitted.

As illustrated in FIG. 7 and FIG. 8, in an inductor component 1D, a coil 15D includes a third inductor wiring 21D and a fourth inductor wiring 22D. The third inductor wiring 21D is disposed above the fourth inductor wiring 22D. The third inductor wiring 21D has 0.5 or less turns and corresponds to the “small-turn inductor wiring” described in the claims. The fourth inductor wiring 22D has a spiral shape of one or more turns, and corresponds to “another inductor wiring” described in the claims. The fourth inductor wiring 22D overlaps at least part of the third inductor wiring 21D when viewed in the first direction. The fourth inductor wiring 22D does not unnecessarily spread in the planar direction orthogonal to the first direction, and this makes it possible to enlarge the volume of the element body 10.

An outer peripheral end 23*b* of the third inductor wiring 21D is connected to the first external terminal 41 through the first vertical wiring 51 on an upper side of the outer peripheral end 23*b*. An inner peripheral end 23*a* of the third inductor wiring 21D is connected to an inner peripheral end 24*a* of the fourth inductor wiring 22D through a via wiring (not illustrated) on a lower side of the inner peripheral end 23*a*. An outer peripheral end 24*b* of the fourth inductor wiring 22D is connected to the second external terminal 42 through the second vertical wiring 52 on an upper side of the outer peripheral end 24*b*. With the configuration described above, the third inductor wiring 21D and the fourth inductor wiring 22D are connected in series and electrically connected to the first external terminal 41 and the second external terminal 42.

A coating film 50 is provided on the first main surface 10*a* of the element body 10. The coating film 50 is made of an insulation material. The coating film 50 exposes end surfaces of the first external terminal 41 and the second external terminal 42. The coating film 50 may suppress a short circuit between the first external terminal 41 and the second external terminal 42.

The third inductor wiring 21D and the fourth inductor wiring 22D are covered by an insulation layer 60D. The insulation layer 60D has a first insulation portion 61D covering the third inductor wiring 21D and a second insulation portion 62D covering the fourth inductor wiring 22D. Part of the first insulation portion 61D is present between the third inductor wiring 21D and the fourth inductor wiring 22D in the first direction.

The first insulation portion 61D covers the third inductor wiring 21D and continuously extends in an extending direction of the third inductor wiring 21D. The first insulation portion 61D has a first portion 61D1 covering the third inductor wiring 21D and a second portion 61D2 not covering the third inductor wiring 21D.

As illustrated in FIG. 8, in the first cross-section orthogonal to the extending direction of the third inductor wiring 21D, the first portion 61D1 has a top surface portion 61, a bottom surface portion 62, a first side surface portion 63, a second side surface portion 64, a top surface side first protrusion 65, a top surface side second protrusion 66, a bottom surface side first protrusion 67, and a bottom surface side second protrusion 68, as in the first embodiment.

In a second cross-section orthogonal to an extending direction of the second portion 61D2, the second portion 61D2 has a main body portion 90, a top surface portion 91, a bottom surface portion 92, a top surface side first protrusion 95, a top surface side second protrusion 96, a bottom surface side first protrusion 97, and a bottom surface side second protrusion 98. In this embodiment, the first cross-section and the second cross-section are the same cross-section.

The main body portion 90 is present at a position corresponding to the extending direction of the third inductor wiring 21D. The top surface portion 91 is positioned further in the first direction relative to the main body portion 90. The bottom surface portion 92 is positioned further in the second direction relative to the main body portion 90. The top surface side first protrusion 95 protrudes from the top surface portion 91 further in a fifth direction orthogonal to the first direction relative to the main body portion 90. The top surface side second protrusion 96 protrudes from the top surface portion 91 further in a sixth direction opposite from the fifth direction relative to the main body portion 90. The bottom surface side first protrusion 97 protrudes from the bottom surface portion 92 further in the fifth direction relative to the main body portion 90. The bottom surface side second protrusion 98 protrudes from the bottom surface portion 92 further in the sixth direction relative to the main body portion 90. The top surface portion 91 is in contact with an upper surface of the main body portion 90. The bottom surface portion 92 is in contact with a lower surface of the main body portion 90. In this embodiment, the fifth direction is the reverse Y-direction and is the same as the third direction. The sixth direction is the Y-direction, and is the same as the fourth direction.

With the configuration described above, since the second portion 61D2 is provided in addition to the first portion 61D1, a contact area between the first insulation portion 61D of the insulation layer 60D and the element body 10 may further be increased by the second portion 61D2, and the first protrusions 95 and 97 and the second protrusions 96 and 98 of the second portion 61D2 may be made to enter the element body 10. Thus, a degree of adhesion between the insulation layer 60D and the element body 10 is further increased, and the reliability of the inductor component 1D may further be increased.

Further, by providing a dummy insulation layer such as the second portion 61D2, when the fourth inductor wiring 22D is laminated relatively shifting from part of the third inductor wiring 21D when viewed in the first direction, the fourth inductor wiring 22D may relatively be overlapped with the second portion 61D2 in addition to the first portion 61D1 when viewed in the first direction. This makes it possible to ensure the flatness of the third inductor wiring 21D and the fourth inductor wiring 22D.

As illustrated in FIG. 8, the second insulation portion 62D is in contact with the bottom surface and the side surfaces of the fourth inductor wiring 22D, and is not in contact with the top surface of the fourth inductor wiring 22D. The top surface of the fourth inductor wiring 22D is in contact with the bottom surface portion 62 of the first insulation portion 61D and the bottom surface portion 92. Similar to the first insulation portion 61D, the second insulation portion 62D has a first protrusion and a second protrusion on the bottom surface side, but need not have the first protrusion and the second protrusion.

In the fourth embodiment, the second portion has a top surface portion and a bottom surface portion. However, it is sufficient that the second portion has at least one portion of the top surface portion and the bottom surface portion, and that a first protrusion and a second protrusion protrude from the at least one portion.

In the fourth embodiment, the first protrusion and the second protrusion of the second portion extend in a horizontal direction, but may be slanted in the first direction or the second direction.

In the fourth embodiment, the third inductor wiring is disposed above the fourth inductor wiring, but the third inductor wiring may be disposed below the fourth inductor wiring.

In the fourth embodiment, the fourth inductor wiring as "another inductor wiring" has one or more turns, but more than 0.5 turns are sufficient.

Manufacturing Method

Next, a method of manufacturing the inductor component 1 will be described. FIG. 9A to FIG. 9K correspond to the A-A section in FIG. 7 (FIG. 8).

Figure 9A:
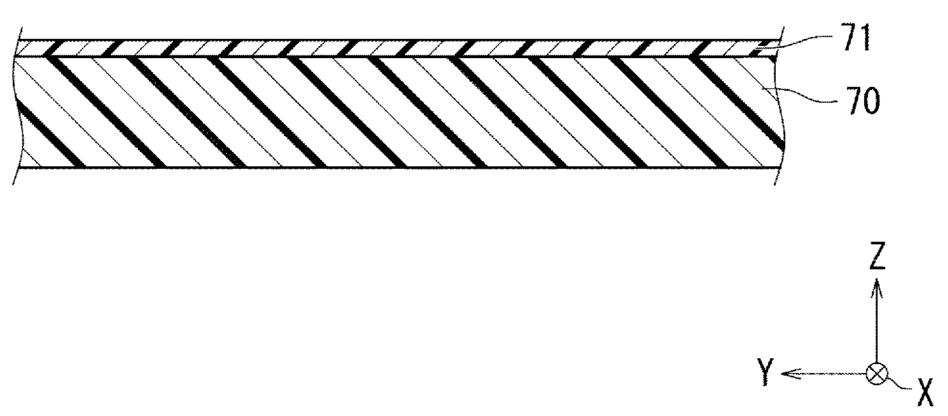
FIG. 9A is a diagram for describing a method of manufacturing an inductor component.

As illustrated in FIG. 9A, a base substrate 70 is prepared. The base substrate 70 is made of an inorganic material such as ceramic, glass, or silicon, for example. A first insulation layer 71 is applied on the main surface of the base substrate 70, and the first insulation layer 71 is cured.

Figure 9B:
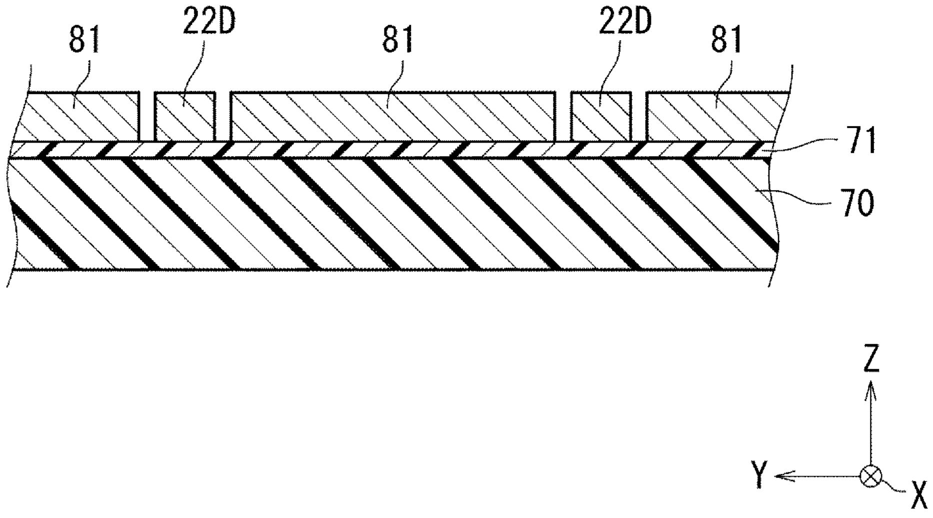
FIG. 9B is a diagram for describing the method of manufacturing the inductor component.

As illustrated in FIG. 9B, a seed layer (Ti/Cu: not illustrated) is formed on the first insulation layer 71 by a known method such as a sputtering method or a vapor deposition method. Thereafter, a dry film resist (DFR) is attached and a predetermined pattern is formed on the DFR by using a photolithography method in the same manner as in FIG. 4B.

Then, the fourth inductor wiring 22D and a first dummy wiring 81 are formed on the first insulation layer 71 by using an electrolytic plating method while feeding electricity to the seed layer. Thereafter, the DFR is stripped and the seed layer is etched. With this, gaps are provided between the fourth inductor wiring 22D and the first dummy wiring 81.

Figure 9C:
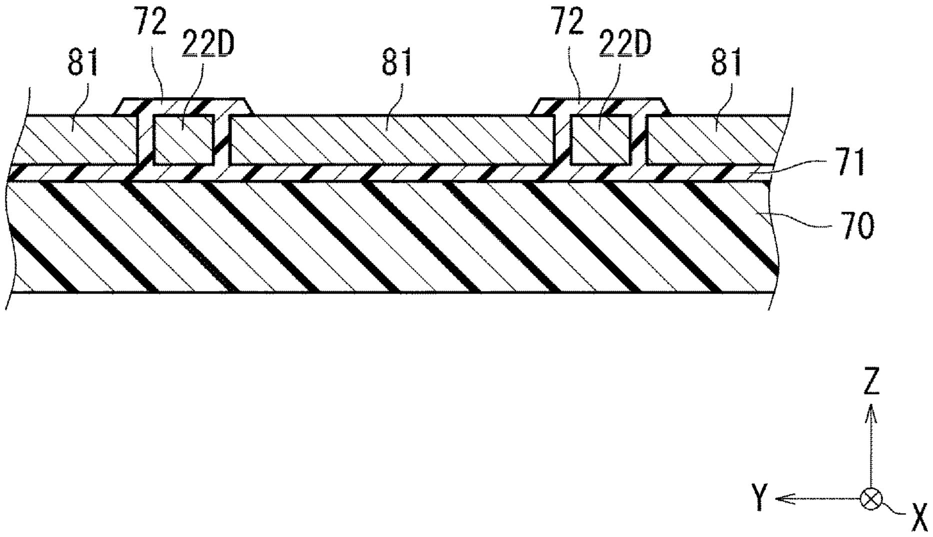
FIG. 9C is a diagram for describing the method of manufacturing the inductor component.

As illustrated in FIG. 9C, a second insulation layer 72 is applied on the fourth inductor wiring 22D and the first dummy wiring 81, and is cured. At this time, the gap is also filled with the second insulation layer 72. Thereafter, an opening portion is formed by irradiating the second insulation layer 72 with a laser such that the first dummy wiring 81 is exposed. At this time, part of the second insulation layer 72 is made to overlap the first dummy wiring 81. The overlapping portions of the second insulation layer 72 correspond to the bottom surface side first protrusion and the bottom surface side second protrusion. Note that, as in the first embodiment, an annular opening portion may be formed in the second insulation layer 72 on the dummy wiring 81. With this, the laser irradiation time may be shortened.

Thereafter, although not illustrated, an opening portion is formed in the second insulation layer 72 such that part of the fourth inductor wiring 22D is exposed, and a seed layer is formed on the second insulation layer 72. The DFR is attached again, and a predetermined pattern is formed on the DFR by using a photolithography method. The predetermined pattern is a through-hole corresponding to a position on the fourth inductor wiring 22D where the third inductor wiring 21D and the second vertical wiring 52 are provided. The via wiring 35 is formed on the fourth inductor wiring 22D by using electrolytic plating. Thereafter, the DFR is stripped and the seed layer is etched.

Figure 9D:
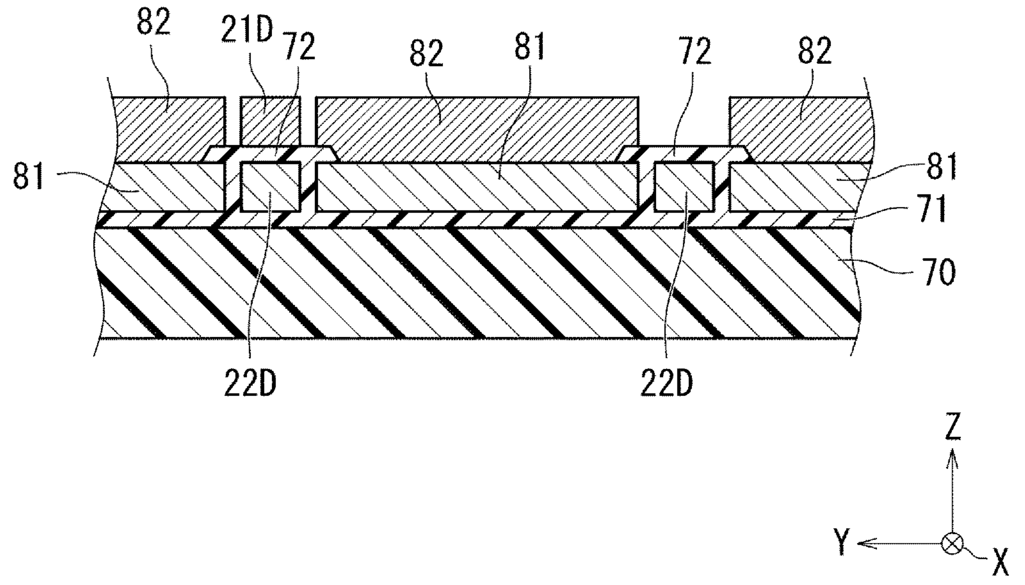
FIG. 9D is a diagram for describing the method of manufacturing the inductor component.

As illustrated in FIG. 9D, a seed layer (Ti/Cu: not illustrated) is formed on the first dummy wiring 81 and the second insulation layer 72 by a known method such as a sputtering method or a vapor deposition method. Thereafter, the dry film resist (DFR) is attached and a predetermined pattern is formed on the DFR by using a photolithography method in the same manner as in FIG. 9B.

Then, the third inductor wiring 21D and a second dummy wiring 82 are formed on the second insulation layer 72 by using an electrolytic plating method while feeding electricity to the seed layer. Thereafter, the DFR is stripped and the seed layer is etched. With this, gaps are provided between the third inductor wiring 21D and the second dummy wiring 82.

Figure 9E:
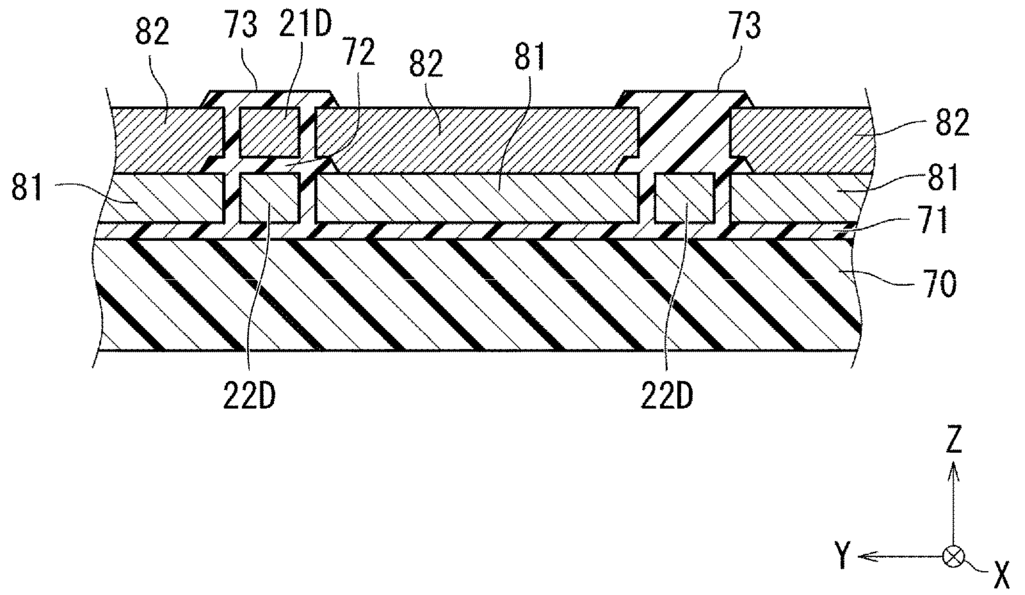
FIG. 9E is a diagram for describing the method of manufacturing the inductor component.

As illustrated in FIG. 9E, a third insulation layer 73 is applied on the third inductor wiring 21D and the second dummy wiring 82, and is cured. At this time, the gap is also filled with the third insulation layer 73. Thereafter, an opening portion is formed by irradiating the third insulation layer 73 with a laser such that the second dummy wiring 82 is exposed. At this time, part of the third insulation layer 73 is made to overlap the second dummy wiring 82. The overlapping portions of the third insulation layer 73 correspond to the top surface side first protrusion and the top surface side second protrusion. Note that an annular opening portion may be formed also in the third insulation layer 73 on the second dummy wiring 82. This makes it possible to shorten the laser irradiation time.

Thereafter, although not illustrated, an opening portion is formed in the third insulation layer 73 such that part of the third inductor wiring 21D is exposed, and a seed layer is formed on the third insulation layer 73. The DFR is attached again, and a predetermined pattern is formed on the DFR by using a photolithography method. The predetermined pattern is, on the third inductor wiring 21D, a through-hole corresponding to a position where the first vertical wiring 51 is provided, and further a through-hole corresponding to a position where the second vertical wiring 52 is provided. By using electrolytic plating, on the third inductor wiring 21D, the first vertical wiring 51 is formed, and further the second vertical wiring 52 is formed. Thereafter, the DFR is stripped and the seed layer is etched.

Figure 9F:
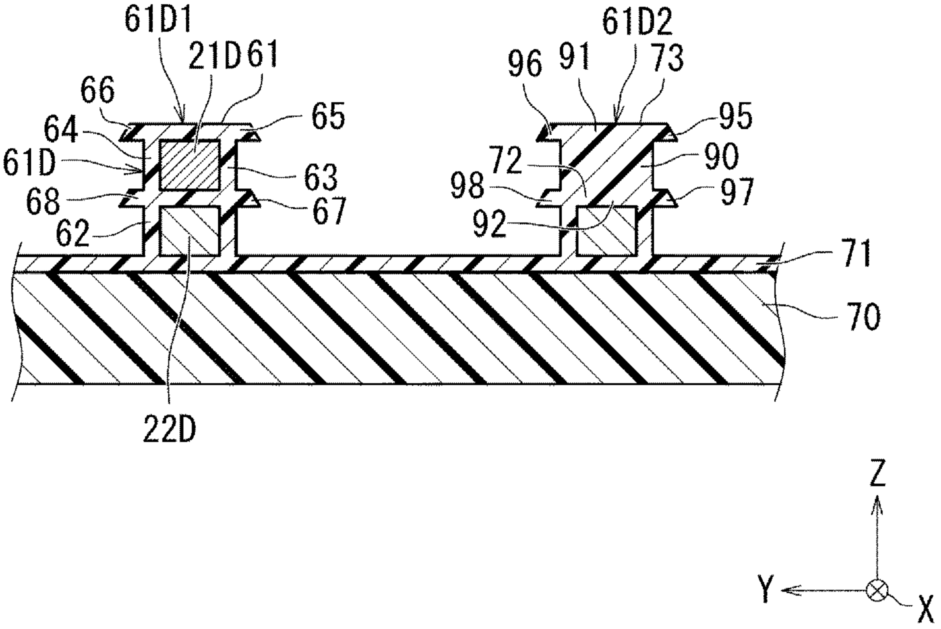
FIG. 9F is a diagram for describing the method of manufacturing the inductor component.

Then, the DFR is provided to protect the first vertical wiring 51 and the second vertical wiring 52, and thereafter, as illustrated in FIG. 9F, the first dummy wiring 81 and the second dummy wiring 82 are etched and the DFR is stripped. Thus, the first insulation portion 61D having the first portion 61D1 and the second portion 61D2 is formed. That is, the top surface portion 61, the bottom surface portion 62, the first side surface portion 63, the second side surface portion 64, the top surface side first protrusion 65, the top surface side second protrusion 66, the bottom surface side first protrusion 67, and the bottom surface side second protrusion 68 of the first portion 61D1 are formed. Further, the main body portion 90, the top surface portion 91, the bottom surface portion 92, the top surface side first protrusion 95, the top surface side second protrusion 96, the bottom surface side first protrusion 97, and the bottom surface side second protrusion 98 of the second portion 61D2 are formed.

Figure 9G:
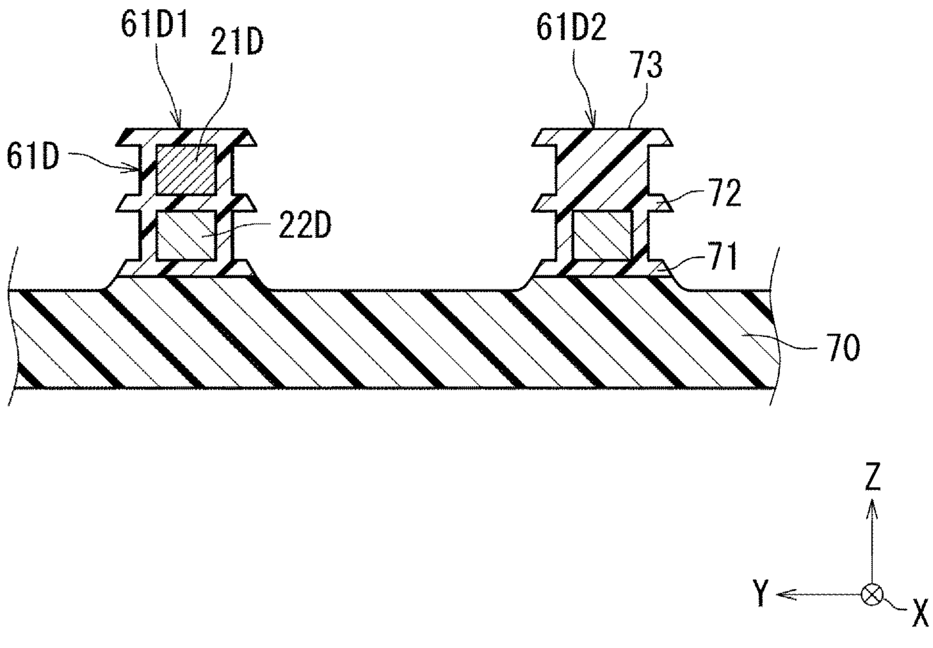
FIG. 9G is a diagram for describing the method of manufacturing the inductor component.

As illustrated in FIG. 9G, an opening portion is formed by irradiating part of the first insulation layer 71 and part of the base substrate 70 with a laser. The opening portion is provided at a position corresponding to a magnetic path of a coil.

Figure 9H:
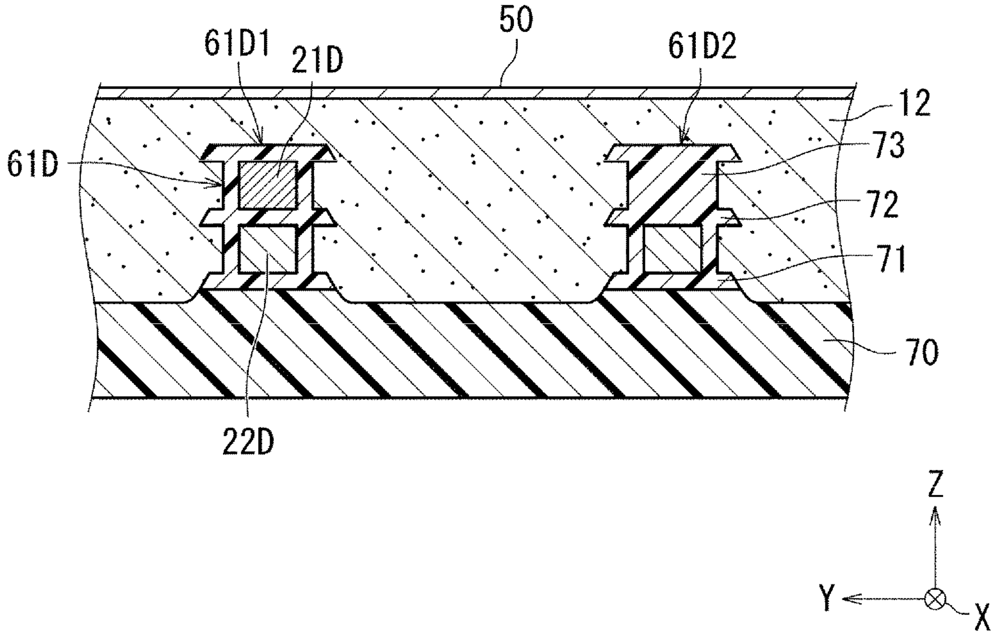
FIG. 9H is a diagram for describing the method of manufacturing the inductor component.

As illustrated in FIG. 9H, a magnetic sheet to be the second magnetic layer 12 is pressure bonded from above the main surface of the base substrate 70 toward the third inductor wiring 21D and the fourth inductor wiring 22D. Thus, the third inductor wiring 21D, the fourth inductor wiring 22D, the first vertical wiring 51, and the second vertical wiring 52 are covered by the second magnetic layer 12. Thereafter, the upper surface of the second magnetic layer 12 is polished to expose the end surfaces of the first vertical wiring 51 and the second vertical wiring 52 from the upper surface of the second magnetic layer 12.

Thereafter, the coating film 50 is applied on the upper surface of the second magnetic layer 12. Then, the coating film 50 is formed into a predetermined pattern by using a photolithography method, and is cured. The predetermined pattern has opening portions at positions corresponding to the first external terminal 41 and the second external terminal 42. The first external terminal 41 and the second external terminal 42 are formed in the openings.

Figure 9I:
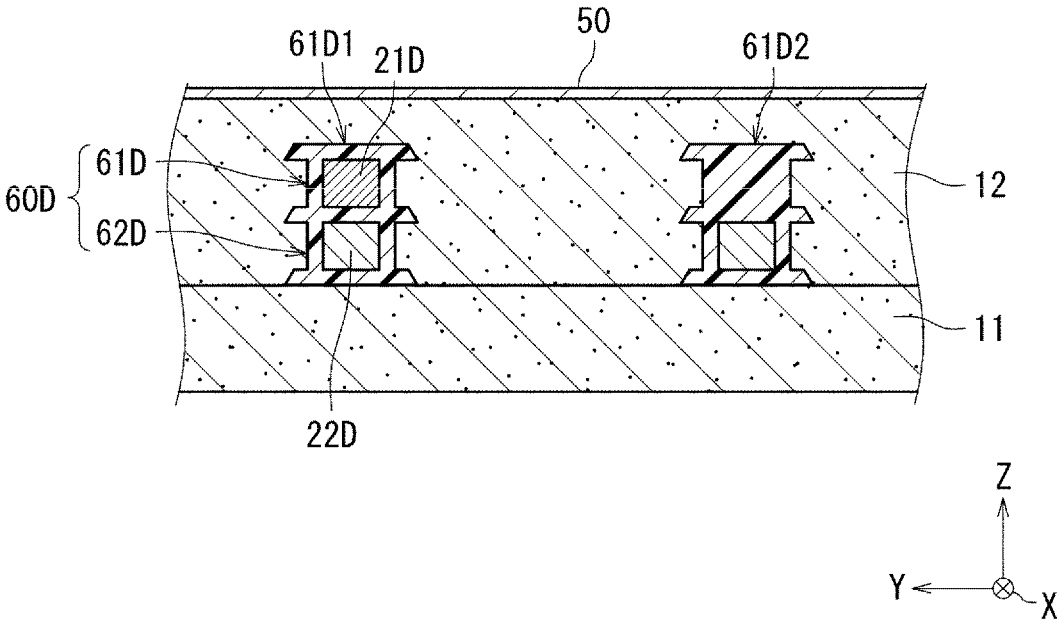
FIG. 9I is a diagram for describing the method of manufacturing the inductor component.

As illustrated in FIG. 9I, the base substrate 70 is removed by polishing. At this time, part of the first insulation layer 71 may also be removed. Thus, the second insulation portion 62D is formed, and the second insulation portion 62D together with the first insulation portion 61D forms the insulation layer 60D. Thereafter, another magnetic sheet to be the first magnetic layer 11 is pressure bonded from below the fourth inductor wiring 22D toward the fourth inductor wiring 22D. Thus, the fourth inductor wiring 22D is covered by the first magnetic layer 11. Thereafter, the first magnetic layer 11 is polished to a predetermined thickness.

Figure 9J:
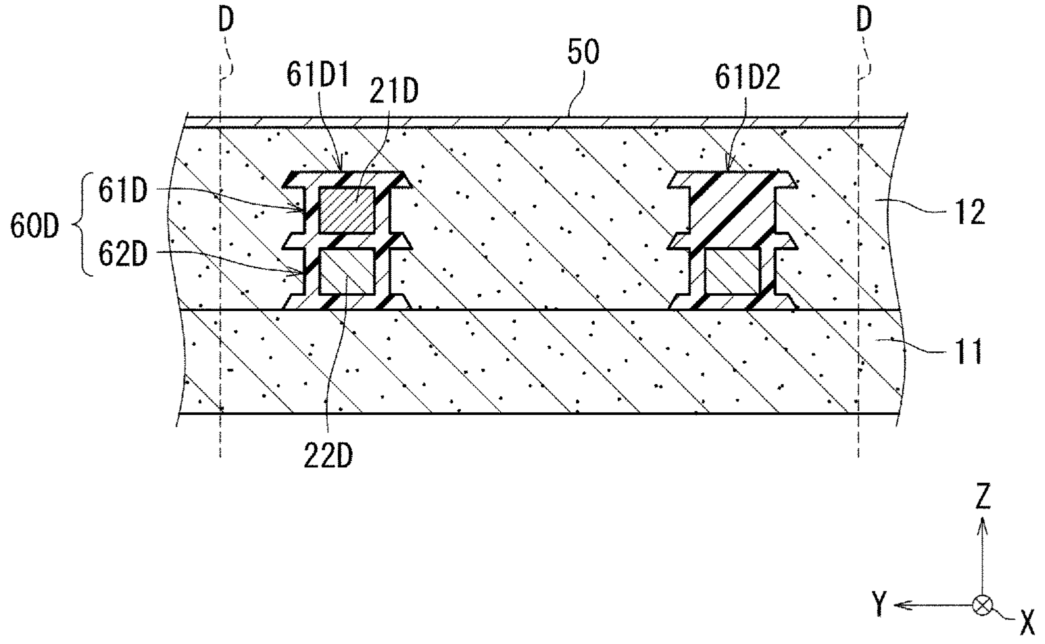
FIG. 9J is a diagram for describing the method of manufacturing the inductor component.
Figure 9K:
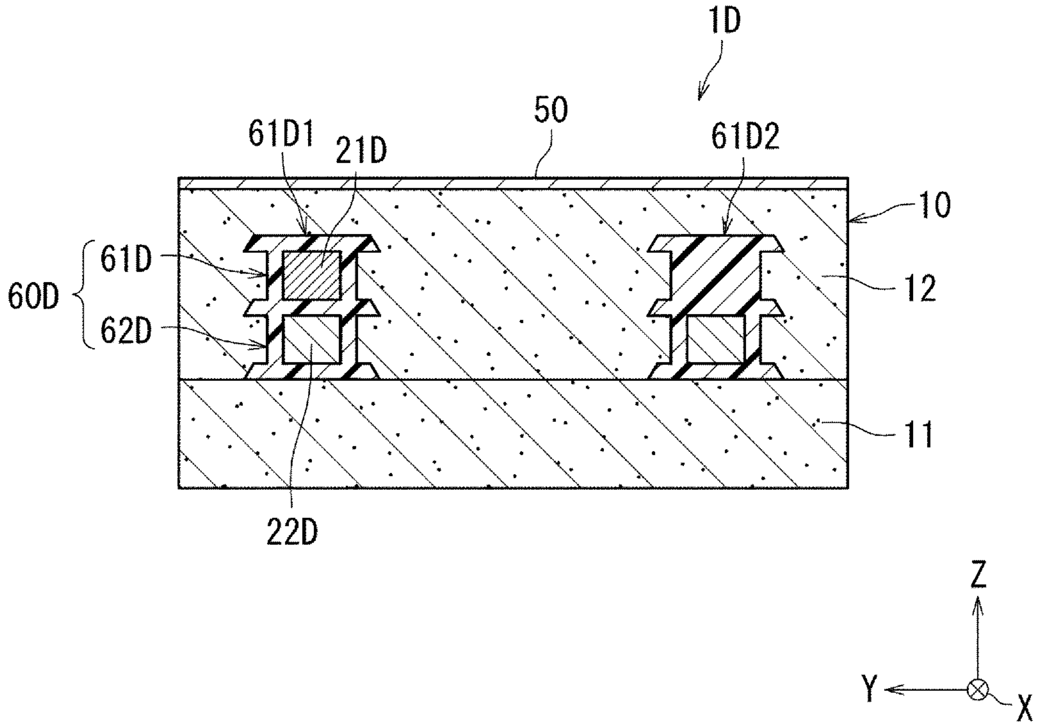
FIG. 9K is a diagram for describing the method of manufacturing the inductor component.

As illustrated in FIG. 9J, an individual inductor component is obtained by cutting along the cut lines D, and as illustrated in FIG. 9K, the inductor component 1D is manufactured.

Fifth Embodiment

Figure 10:
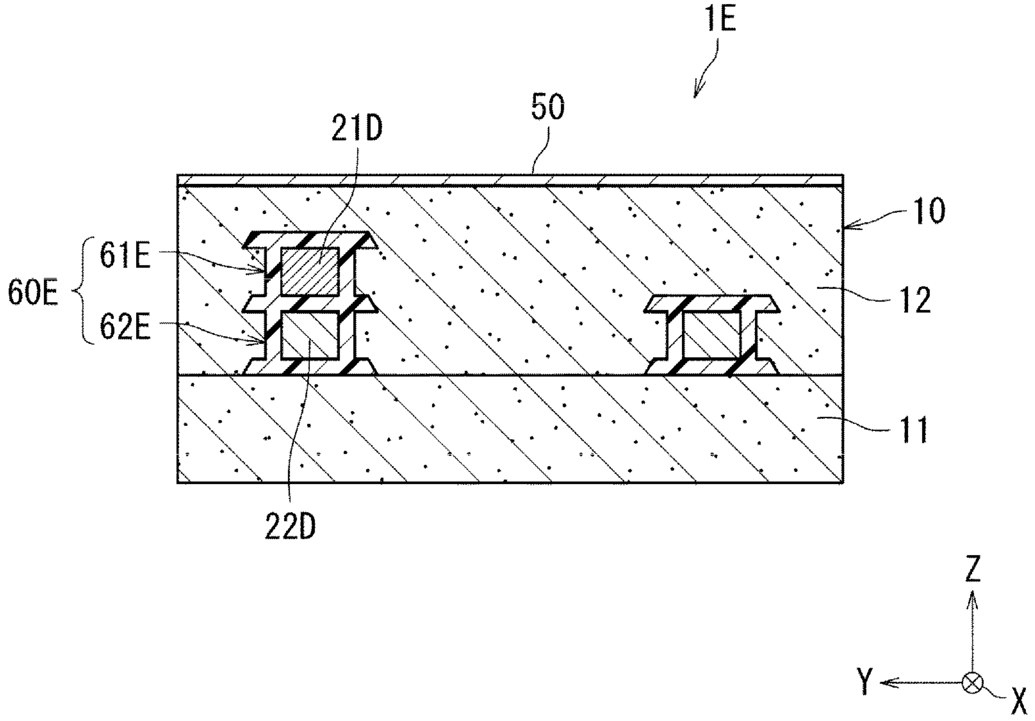
FIG. 10 is a sectional view illustrating an inductor component according to a fifth embodiment.

FIG. 10 is a sectional view illustrating an inductor component according to a fifth embodiment. FIG. 10 is a sectional view corresponding to FIG. 8. The fifth embodiment is different from the fourth embodiment in the configuration of an insulation layer. This different configuration will be described below. Other configurations are the same as those of the fourth embodiment, and are denoted by the same reference signs as those of the fourth embodiment, and a description thereof will be omitted.

As illustrated in FIG. 10, in an inductor component 1E, an insulation layer 60E has a first insulation portion 61E covering the third inductor wiring 21D and a second insulation portion 62E covering the fourth inductor wiring 22D. That is, the first insulation portion 61E corresponds to the first portion 61D1 of the fourth embodiment, and does not include the second portion 61D2 of the fourth embodiment. The second insulation portion 62E has the same configuration as the second insulation portion 62D of the fourth embodiment.

The second magnetic layer 12 being at the same position as the third inductor wiring 21D in the first direction overlaps part of the fourth inductor wiring 22D, when viewed in a direction orthogonal to the first direction. With this, the volume of the second magnetic layer 12 (magnetic path of a coil) may be increased.

The second magnetic layer 12 overlapping part of the fourth inductor wiring 22D is positioned in the first direction of the fourth inductor wiring 22D. With this, it is easy to perform filling with the second magnetic layer 12 at the time of manufacturing.

Note that the first magnetic layer may be present at the same position as the third inductor wiring in the first direction, and the first magnetic layer preferably overlaps part of the fourth inductor wiring when viewed in a direction orthogonal to the first direction. With this, the volume of the first magnetic layer 11 (magnetic path of a coil) may be increased.

In the case above, the first magnetic layer overlapping part of the fourth inductor wiring is preferably positioned in the second direction of the fourth inductor wiring. With this, it is easy to perform filling with the first magnetic layer at the time of manufacturing.

Sixth Embodiment

Figure 11:
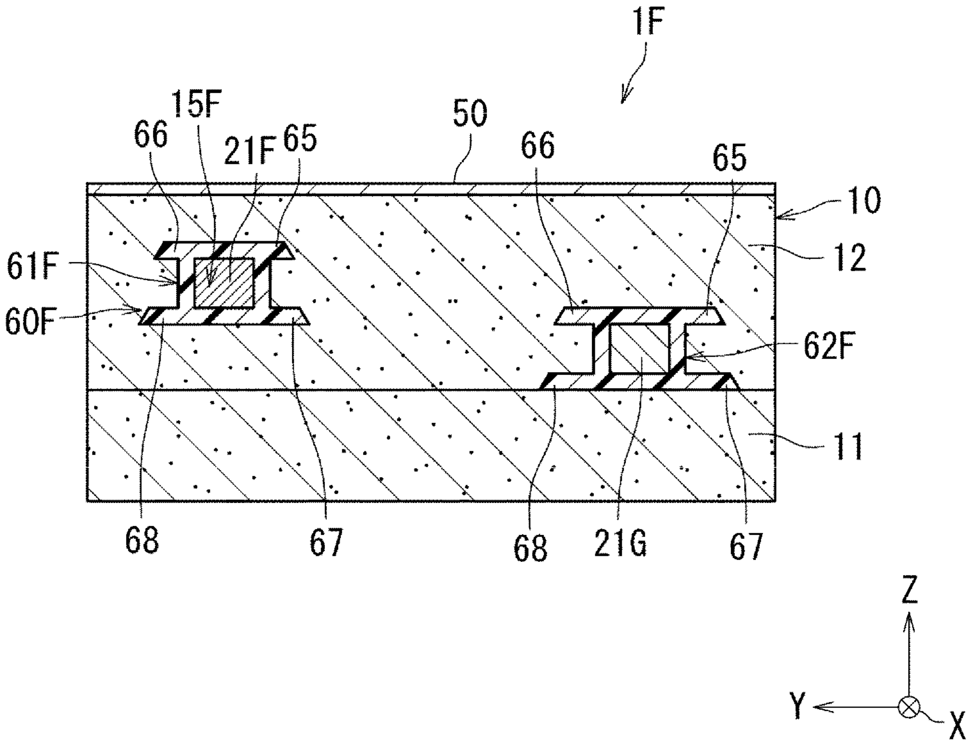
FIG. 11 is a sectional view illustrating an inductor component according to a sixth embodiment.

FIG. 11 is a sectional view illustrating an inductor component according to a sixth embodiment. FIG. 11 is a sectional view corresponding to FIG. 8. The sixth embodiment is different from the fourth embodiment in the configuration of a coil and an insulation layer. This different configuration will be described below. Other configurations are the same as those of the fourth embodiment, and are denoted by the same reference signs as those of the fourth embodiment, and a description thereof will be omitted.

As illustrated in FIG. 11, in an inductor component 1F, a coil 15F includes a fifth inductor wiring 21F and a sixth inductor wiring 21G laminated in the first direction. The fifth inductor wiring 21F is disposed above the sixth inductor wiring 21G. Each of the fifth inductor wiring 21F and the sixth inductor wiring 21G has 0.5 or less turns, and corresponds to the "small-turn inductor wiring" described in the claims. The fifth inductor wiring 21F and the sixth inductor wiring 21G are connected in series and electrically connected to the first external terminal 41 and the second external terminal 42.

An insulation layer 60F includes a first insulation portion 61F covering the fifth inductor wiring 21F and a second insulation portion 62F covering the sixth inductor wiring 21G. That is, each of the first insulation portion 61F and the second insulation portion 62F corresponds to the first portion 61D1 of the fourth embodiment, and does not include the second portion 61D2 of the fourth embodiment.

Preferably, in all of first protrusions 65 and 67 and second protrusions 66 and 68, a protrusion with a different length is present. Specifically, in the first protrusions 65 and 67 and the second protrusions 66 and 68 of the first insulation portion 61F, and the first protrusions 65 and 67 and the second protrusions 66 and 68 of the second insulation portion 62F, a protrusion with a different length is present.

With the configuration described above, it is possible to further increase the degree of adhesion between the insulation layer and the element body 10 by increasing the length of some of the first or second protrusions. Further, by decreasing the length of some of the first or second protrusions, the magnetic resistance of the magnetic path may be reduced and the inductance acquisition efficiency may be increased.

Preferably, the lengths of the first protrusions 65 and 67 and the second protrusions 66 and 68 are shorter in the fifth inductor wiring 21F positioned further in the first direction. Specifically, the lengths of the first protrusions 65 and 67 and the second protrusions 66 and 68 of the first insulation portion 61F are shorter than the lengths of the first protrusions 65 and 67 and the second protrusions 66 and 68 of the second insulation portion 62F.

With the configuration described above, the lengths of the first protrusions 65 and 67 and the second protrusions 66 and 68 are shorter in the fifth inductor wiring 21F positioned further in the first direction. This makes the area of the magnetic path of the coil 15F increase in the first direction. Thus, when the coil F is filled with the second magnetic layer 12 in the second direction from the first direction side of the coil 15F at the time of manufacturing, the filling the coil 15F with the second magnetic layer 12 becomes easy. This makes the filling rate be increased, and the inductance may be increased.

Preferably, the coil 15F configures one turn with the fifth inductor wiring 21F and the sixth inductor wiring 21G being connected in series. All of the first protrusions 65 and 67 and the second protrusions 66 and 68 are positioned in either an inner magnetic path or an outer magnetic path of the coil 15F. Specifically, the first protrusions 65 and 67 of the first insulation portion 61F and the second protrusions 66 and 68 of the second insulation portion 62F are positioned in the inner magnetic path of the coil 15F. The second protrusions 66 and 68 of the first insulation portion 61F and the first protrusions 65 and 67 of the second insulation portion 62F are positioned in the outer magnetic path of the coil 15F.

With the configuration described above, a degree of adhesion between the insulation layer 60F and the element body 10 may further be increased.

Preferably, a material of the second insulation portion 62F covering the sixth inductor wiring 21G of the first layer is different from a material of the first insulation portion 61F covering the fifth inductor wiring 21F of the second layer.

With the configuration described above, a degree of freedom in design may be increased. For example, it is preferable that the material of the second insulation portion 62F be selected in light of stripping from a base substrate and stress. Whereas, it is preferable that the material of the first insulation portion 61F be selected in view of such as laser or photolithography resolution, or a step coverage.

Note that a small-turn inductor wiring may be present in three layers or more in the first direction. Further, a coil may be configured as one or more turns by connecting multiple small-turn inductor wirings in series. Further, the small-turn inductor wiring may have n ($n \geq 2$) layers in the first direction, and a material of an insulation layer covering the small-turn inductor wiring of a first layer may be different from a material of an insulation layer covering the small-turn inductor wiring of an m-th ($2 \leq m \leq n$) layer.

Note that the present disclosure is not limited to the embodiments described above, and design changes can be made without departing from the gist of the present disclosure. For example, the features of the first to sixth embodiments may be combined in various ways.

In the embodiment described above, the “inductor wiring” is a wiring that gives inductance to an inductor component by generating a magnetic flux in a magnetic layer when a current flows, and its structure, shape, material, and the like are not particularly limited. In particular, the shape is not limited to a straight line or a curve (spiral: two-dimensional curve) extending on a plane as in the embodiment, and various known wiring shapes such as a meander wiring may be used.

What is claimed is:

1. An inductor component, comprising:

an element body, a coil disposed in the element body, and an insulation layer that is a non-magnetic layer covering at least part of the coil, wherein the element body includes a first magnetic layer and a second magnetic layer laminated in order in a first direction, the coil includes a small-turn inductor wiring of 0.5 or less turns extending along a plane orthogonal to the first direction between the first magnetic layer and the second magnetic layer, in a first cross-section orthogonal to an extending direction of the small-turn inductor wiring, the small-turn inductor wiring has a top surface facing in the first direction, a bottom surface facing in a second direction opposite to the first direction, a first side surface facing in a third direction orthogonal to the first direction, and a second side surface facing in a fourth direction opposite to the third direction, and the insulation layer includes at least one portion of a top surface portion located further in the first direction with respect to the top surface or a bottom surface portion located further in the second direction with respect to the bottom surface, a first side surface portion covering the first side surface, a second side surface portion covering the second side surface, a first protrusion protruding from the at least one portion further in the third direction with respect to the first side surface portion, and a second protrusion protruding from the at least one portion further in the fourth direction with respect to the second side surface portion.

2. The inductor component according to claim 1, wherein the small-turn inductor wiring includes multiple layers in the first direction, and in the first cross-section, the small-turn inductor wiring positioned further in the first direction has shorter lengths of the first protrusion and the second protrusion.

3. The inductor component according to claim 1, wherein in the first cross-section, at least one of the first protrusion and the second protrusion is slanted in the second direction.

4. The inductor component according to claim 1, wherein in the first cross-section, at least one of the first protrusion and the second protrusion is slanted in the first direction.

5. The inductor component according to claim 1, wherein the small-turn inductor wiring includes multiple layers in the first direction, the coil is configured to have one or more turns by connecting in series the multiple layers of the small-turn inductor wiring, and in the first cross-section, all of first protrusions and second protrusions are positioned in either an inner magnetic path or an outer magnetic path of the coil.

6. The inductor component according to claim 1, wherein in the first cross-section, a length of the first protrusion is different from a length of the second protrusion.

7. The inductor component according to claim 1, wherein n (n≥2) layers of the small-turn inductor wiring are in the first direction, and a material of the insulation layer covering a first layer of the small-turn inductor wiring is different from a material of the insulation layer covering an m-th (2≤m≤n) layer of the small-turn inductor wiring.

8. The inductor component according to claim 1, wherein the first magnetic layer and the second magnetic layer contain magnetic powder, and a contact surface of the second magnetic layer with the first magnetic layer includes a sectional plane of the magnetic powder, and a contact surface of the first magnetic layer with the second magnetic layer includes a surface of the magnetic powder.

9. The inductor component according to claim 1, wherein the insulation layer covers the small-turn inductor wiring, continuously extends in an extending direction of the small-turn inductor wiring, and has a first portion covering the small-turn inductor wiring and a second portion not covering the small-turn inductor wiring, in a second cross-section orthogonal to an extending direction of the second portion, the second portion includes a main body portion at a position corresponding to the extending direction of the small-turn inductor wiring, at least one portion of a top surface portion positioned further in the first direction with respect to the main body portion or a bottom surface portion positioned further in the second direction with respect to the main body portion, a first protrusion protruding from the at least one portion further in a fifth direction orthogonal to the first direction with respect to the main body portion, and a second protrusion protruding from the at least one portion further in a sixth direction opposite from the fifth direction with respect to the main body portion.

10. The inductor component according to claim 1, wherein the small-turn inductor wiring includes multiple layers in the first direction, and in the first cross-section, a protrusion with a different length is included in all of first protrusions and second protrusions.

11. The inductor component according to claim 10, wherein the small-turn inductor wiring includes multiple layers in the first direction, and in the first cross-section, the small-turn inductor wiring positioned further in the first direction has shorter lengths of the first protrusion and the second protrusion.

12. The inductor component according to claim 10, wherein in the first cross-section, at least one of the first protrusion and the second protrusion is slanted in the second direction.

13. The inductor component according to claim 10, wherein in the first cross-section, at least one of the first protrusion and the second protrusion is slanted in the first direction.

14. The inductor component according to claim 10, wherein the small-turn inductor wiring includes multiple layers in the first direction, the coil is configured to have one or more turns by connecting in series the multiple layers of the small-turn inductor wiring, and in the first cross-section, all of first protrusions and second protrusions are positioned in either an inner magnetic path or an outer magnetic path of the coil.

15. The inductor component according to claim 1, further comprising:

another inductor wiring at a position overlapping at least part of the small-turn inductor wiring when viewed in the first direction.

16. The inductor component according to claim 15, wherein in the first direction, the first magnetic layer or the second magnetic layer at a same position as the small-turn inductor wiring overlaps a portion of the other inductor wiring when viewed in a direction orthogonal to the first direction.

17. The inductor component according to claim 16, wherein the first magnetic layer or the second magnetic layer overlapping the portion of the other inductor wiring is the second magnetic layer positioned in the first direction of the other inductor wiring.

18. The inductor component according to claim 16, wherein the first magnetic layer or the second magnetic layer overlapping the portion of the other inductor wiring is the first magnetic layer positioned in the second direction of the other inductor wiring.

* * * * *